(12) United States Patent
Morrison et al.

(10) Patent No.: US 9,983,637 B1
(45) Date of Patent: May 29, 2018

(54) HINGE WITH 180 DEGREE RANGE FOR COMPUTING DEVICE WITH MULTIPLE DISPLAYS

(71) Applicant: Dell Products L. P., Round Rock, TX (US)

(72) Inventors: John Trevor Morrison, Round Rock, TX (US); Christopher A. Torres, San Marcos, TX (US)

(73) Assignee: Dell Products L. P., Round Rock, TX (US)

( * ) Notice: Subject to any disclaimer, the term of this patent is extended or adjusted under 35 U.S.C. 154(b) by 0 days. days.

(21) Appl. No.: 15/455,718

(22) Filed: Mar. 10, 2017

(51) Int. Cl.
*G06F 1/16* (2006.01)

(52) U.S. Cl.
CPC .......... *G06F 1/1681* (2013.01); *G06F 1/1616* (2013.01); *G06F 1/1647* (2013.01); *G06F 1/1656* (2013.01); *G06F 1/1683* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,283,862 | A * | 2/1994 | Lund | G06F 1/162 345/173 |
| 8,064,970 | B2 * | 11/2011 | Gaddy | G06F 1/1616 379/419 |
| 9,477,269 | B2 * | 10/2016 | Morrison | G06F 1/1681 |
| 9,523,226 | B1 * | 12/2016 | Lam | E05D 11/082 |
| 9,557,775 | B2 * | 1/2017 | Chng | G06F 1/1677 |
| 9,625,954 | B2 * | 4/2017 | Campbell | G06F 1/1681 |
| 9,684,343 | B2 * | 6/2017 | Tazbaz | G06F 1/1637 |
| 2006/0130278 | A1 * | 6/2006 | Chen | G06F 1/1616 16/342 |
| 2011/0018821 | A1 * | 1/2011 | Kii | G06F 1/1616 345/173 |
| 2016/0326786 | A1 * | 11/2016 | Lee | G06F 1/1681 |
| 2016/0357226 | A1 * | 12/2016 | Campbell | G06F 1/1681 |
| 2017/0356227 | A1 * | 12/2017 | Maatta | E05D 11/105 |

* cited by examiner

*Primary Examiner* — Lisa Lea Edmonds
(74) *Attorney, Agent, or Firm* — Campbell Stephenson LLP; Shiv S. Naimpally

(57) ABSTRACT

In some implementations, a computing device includes a first housing coupled to a second housing by hinges. The first housing includes a first display device and a first set of components. The second housing includes a second display device and a second set of components. The hinges include (1) leaves coupling the first housing to the second housing, (2) knuckles to position the first housing at an angle between about 0 degrees to about 180 degrees relative to the second housing, and (3) conduits through which cables are routed between the first housing and the second housing. At about 180 degrees, the first housing is adjacent and sufficiently close to the second housing that the first and second display device provide a nearly contiguous surface. The cables communicate signals between the first set of components in the first housing and the second set of components in the second housing.

20 Claims, 13 Drawing Sheets

HINGE WITH 180 DEGREE RANGE FOR COMPUTING DEVICE WITH MULTIPLE DISPLAYS

BACKGROUND OF THE INVENTION

Field of the Invention

This invention relates generally to computing devices and, more particularly, to computing devices (e.g., information handling systems) with two or more displays that are connected via one or more integrated hinges.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

A computing device, such as a tablet, may include multiple (e.g., two or more) display devices. For example, for a computing device with two display devices, a first housing that includes a first display device may be coupled by one or more hinges to a second housing that includes a second display device.

SUMMARY OF THE INVENTION

This Summary provides a simplified form of concepts that are further described below in the Detailed Description. This Summary is not intended to identify key or essential features and should therefore not be used for determining or limiting the scope of the claimed subject matter.

In some implementations, a computing device includes a first housing coupled to a second housing by one or more hinges. The first housing may include a first display device and a first set of components. The second housing may include a second display device and a second set of components. The one or more hinges may include (1) a plurality of leaves coupling the first housing to the second housing, (2) one or more knuckles to position the first housing at an angle between about 0 degrees to about 180 degrees relative to the second housing, and (3) at least one conduit through which one or more cables are routed. The one or more cables may communicate signals between the first set of components in the first housing and the second set of components in the second housing.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
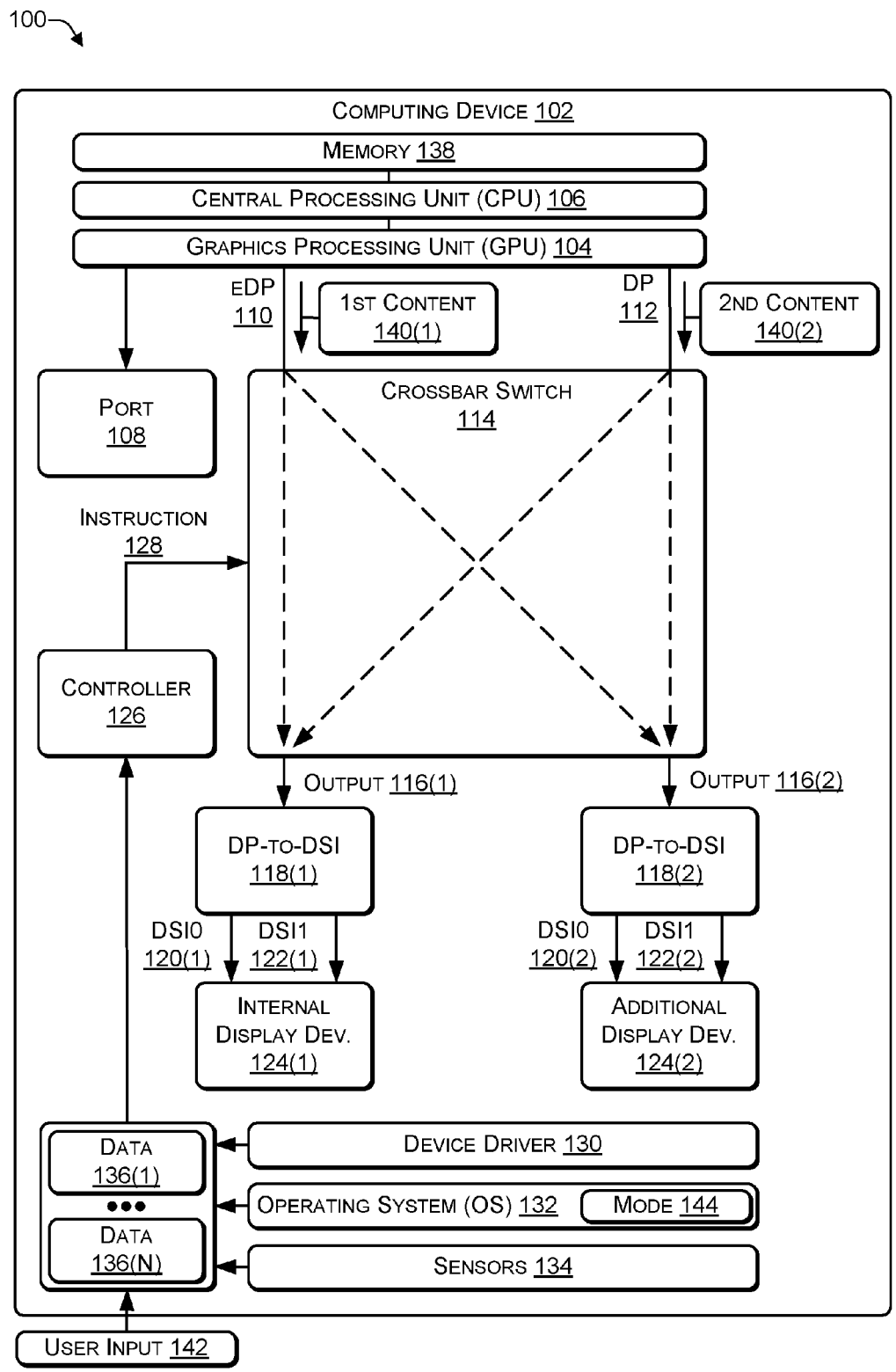
FIG. 1 is a block diagram of an architecture of a computing device that includes a crossbar switch according to some embodiments.

For purposes of this disclosure, an information handling system (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

In some cases, an IHS may be implemented in the form of a computing device with two (or more) housings, with each housing including a display device. For example, each housing may be attached to a neighboring housing using one or more hinges that enable each housing (and each display device) to be placed at an angle (e.g., between about 0 to about 180 degrees) relative to a neighboring housing. The hinges may enable cables, thermal components, mechanical structure and other internal components to function through the full range of motion of the hinges without damage or interruption. For example, cables may pass through the hinges to connect a first set of components in a first housing with a second set of components in a second housing. As another example, components (e.g., processor, memory, and the like) that generate heat may be located in the first housing and may be connected, using a mechanism (e.g., a heat pipe or the like) that passes through the hinges, to a heat dissipation mechanism in the second housing. Heat generated by the components in the first housing may be transferred through the hinges to the second housing and dissipated by the heat dissipation mechanism (e.g., graphene, metal housing, or the like).

The hinges may not be visible (e.g., concealed) through the full range of the hinges, e.g., when the first housing is positioned at between 0 degrees to 180 degrees relative to the second housing. The bezel around each display may be fairly narrow (e.g., 4 mm or less) on at least the edge of the bezel where the hinge is attached. When the hinges are in the 180 degree position, the sides of each housing may be extremely close together (e.g., 2 mm or less) to provide a near seamless display. To illustrate, the sides of each housing may be no more than 6 mm apart, preferably less than 2 mm apart, and most preferably less than 1 mm apart. The edges of the two housings may be brought together in such a way that the two housings are approximately flush, and have the appearance of a single contiguous surface. For example, the narrow bezel and close proximity of the first housing to the second housing may make the first display device (in the first housing) and the second display device (in the second housing) appear as a single display device in the 180 degree position. Furthermore, the operating system of the computing device may be configured to enable the user to treat the first and second display device as a single display device. For example, the first and second display device may each include touch and pressure sensors that are capable of receiving input from an appendage (e.g., user's finger) or a touch input device (e.g., stylus). The user may use the touch and pressure sensors of the display device to provide input while treating the first and second display device as a single display device. For example, the first display device may include a first portion of a sentence while the second display device may include a second portion of the same sentence. Thus, the user may begin writing (e.g., using a stylus) on the first display device (in the first housing) and continue writing on the second display device. The hinges may rotate from about 0 degrees to about 180 degrees to enable internal components, such as cables, thermal dissipation mechanisms, mechanical components, and other components to function without damage or interruption over the full 180 degree range of motion during the life of the computing device.

Thus, the hinge mechanism may not be visible regardless of the angle (e.g., between 0 and 180 degrees) of the first housing relative to the second housing. The hinge mechanism in the open (180 degree) position, may place the edges of the two housings sufficiently close together that the two display devices in the two housings appear, and may be used by the user, as a single display device. The hinge mechanism may be sufficiently robust to withstand repeated use during the lifecycle of the computing device. When the two housings are in the open position (e.g., about 180 degrees relative to each other), the hinges may enable the two housings to be in close proximity (e.g., 2 mm or less) to one another. The hinge mechanism may enable cables and thermal dissipation components to be routed between the two (or more) housings.

In a first example, a computing device may include a first housing, a second housing, and one or more hinges rotatably coupling the first housing to the second housing. The first housing may include a first display device and a first set of components (e.g., central processing unit (CPU), memory, and the like). The second housing may include a second display device and a second set of components (e.g., battery, battery charger, and the like). The one or more hinges may include a plurality of leaves, one or more knuckles, and at least one conduit (e.g., where a conduit is a hollow tube). For example, a first leaf of the plurality of leaves may be attached to the first housing and a second leaf of the plurality of leaves may be attached to the second housing. The one or more knuckles may enable the first housing to be positioned at an angle between about 0 degrees to about 180 degrees relative to the second housing. The hinge may include a dampener mechanism (gears, springs, or the like) that slows the first housing and the second housing when moving close to 0 degrees or when moving close to 180 degrees. When the first housing is at the angle of about 180 degrees relative to the second housing, the first housing is adjacent and sufficiently close to the second housing that the first display device and the second display device provide a nearly contiguous surface.

One or more cables may be routed through the at least one conduit to enable signals to be communicated between the first set of components in the first housing and the second set of components in the second housing. A conductive thermal pipe may be routed through the at least one conduit to enable thermal energy (e.g., heat) to be transferred from one of the housings to a heat dissipation mechanism in another of the housings.

Individual hinges of the one or more hinges may include a plurality of detents such that moving at least one hinge of the plurality of hinges to a first detent of the plurality of detents causes the first housing to remain at a first angle relative to the second housing. Exerting an amount of force greater than a threshold amount may cause the at least one hinge to move from the first detent to a second detent, thereby causing the first housing to be placed at a second angle relative to the second housing. A first set of magnets may be embedded within a first edge of the first housing. The first set of magnets face outward with a first polarity. A second set of magnets (or a set of metal plates) may be embedded within a second edge of the second housing. The second set of magnets may face outward with a second polarity that is an opposite polarity from the first polarity. When the first set of magnets are within a particular distance from the second set of magnets (or the set of metal plates), the first set of magnets have an attraction to the second set of magnets (or the set of metal plates), causing the first housing to move to an angle of about 0 degrees relative to the second housing. Thus, decreasing the angle between the first housing and the second housing may result in the attraction between the first set of magnets and the second set of magnets (or the set of metal plates) exerting sufficient force on the hinge to exceed the threshold, causing the angle to further decrease to about 0 degrees, thereby causing the computing device to be placed in a closed position. In the closed position, an outer surface of the first display device may be parallel to and in close proximity (e.g., 4 mm or less) to an outer surface of the second display device, to protect the outer surfaces of the two display devices.

In some cases, a third set of magnets may be embedded near a hinge edge of the first housing. The hinge edge is a particular edge of each housing to which at least one leaf of the one or more hinges is attached. The third set of magnets face outward with a particular polarity and may have an attraction to a fourth set of magnets or (a set of metal plates) that are embedded in the hinge edge of the second housing. When the third set of magnets are within a particular distance from the hinge edge of the second housing, the third set of magnets have an attraction to the fourth set of magnets (or the set of metal plates), causing the first housing to move to an angle of about 180 degrees relative to the second housing. Thus, increasing the angle between the first housing and the second housing may result in the attraction between the third set of magnets and the fourth set of magnets (or the set of metal plates) exerting sufficient force on the hinge to exceed the threshold, causing the angle to further increase to about 180 degrees, thereby causing the computing device to be automatically placed in an open position. In the open position, an outer surface of the first display device may be in a same plane as and adjacent to an outer surface of the second display device, enabling a user to treat the two display devices as a single, large display device.

As a second example, a computing device may include a first housing coupled to a second housing by one or more hinges. The first housing may be used to house a first display device and a first set of components (e.g., CPU, memory, and the like). The second housing may be used to house a second display device and a second set of components (e.g., battery, charger, and the like). The one or more hinges may include a plurality of leaves coupling the first housing to the second housing, e.g., a first leaf of a hinge may be attached to the first housing and a second leaf of the hinge may be attached to the second housing. Each hinge may include one or more knuckles with a plurality of detents that enable the first housing to be temporarily positioned at an angle between about 0 degrees to about 180 degrees relative to the second housing. When the first housing is at the angle of about 180 degrees relative to the second housing, the first housing is adjacent and sufficiently close (e.g., approximately 2 mm or less) to the second housing that the first display device and the second display device provide a nearly contiguous surface.

The one or more hinges may include at least one conduit. The conduit may be used to route one or more cables from the first housing to the second housing to enable signals to be communicated between the first set of components in the first housing and the second set of components in the second housing. The conduit may be used to route a thermally conductive pipe from the first housing to the second housing to enable thermal energy (e.g., heat) to be transferred from one of the housings for dissipation by a heat dissipation mechanism (e.g., heat sink) in the other of the housings.

Moving at least one hinge of the plurality of hinges to a first detent of the plurality of detents may cause the first housing to be placed at a first angle relative to the second housing. Exerting an amount of force greater than a threshold amount may cause the at least one hinge to move from the first detent to a second detent, thereby moving the first housing from the first angle to a second angle relative to the second housing.

A first set of magnets may be embedded into an edge of the first housing and may face outward with a first polarity. A second set of magnets (or a set of metal plates) may be embedded into an edge of the second housing. The second set of magnets may face outward with a second polarity that is an opposite polarity from the first polarity. When the first set of magnets are placed within a particular distance from the second set of magnets (or the set of metal plates), the first set of magnets may have an attraction to the second set of magnets (or the set of metal plates), causing the first housing to move to an angle of about 0 degrees relative to the second housing. The computing device may be in a closed position when the first housing is at an angle of about 0 degrees relative to the second housing because the outer surfaces of the two display devices are facing each other. A third set of magnets may be embedded into a hinge edge of the first housing, where the hinge edge is a particular edge of a housing to which at least one leaf of a hinge is attached. The third set of magnets may have an attraction to a fourth set of magnets (or a set of metal plates) that are embedded in the hinge edge of the second housing. When the third set of magnets are moved to within a particular distance from the hinge edge of the second housing, the third set of magnets may have an attraction to the fourth set of magnets (or the set of metal plates), causing the first housing to move to an angle of about 180 degrees relative to the second housing. The computing device may be in an open position when the first housing is at an angle of about 180 degrees relative to the second housing because the outer surfaces of the two display devices are in the same plane and adjacent to each other, thereby forming a nearly contiguous surface that the user can treat as a single display device.

As a third example, a computing device may include a first housing rotatably coupled to a second housing by one or more hinges. The first housing may include a first set of magnets embedded into an edge of the first housing, a first display device, and a first set of components (e.g., CPU, memory, and other components of a computer motherboard). The second housing may include a second set of magnets embedded into an edge of the second housing, a second display device, and a second set of components (e.g., battery, charger, and other power-related components).

The one or more hinges may include a plurality of leaves coupling the first housing to the second housing. For example, a first leaf of a hinge may be attached to the first housing and a second leaf of the hinge may be attached to the second housing. The hinges may include one or more knuckles that enable the first housing to be positioned at an angle between about 0 degrees to about 180 degrees relative to the second housing. When the first housing is at the angle of about 180 degrees relative to the second housing, the first housing is adjacent and sufficiently close (e.g., approximately 2 mm or less) to the second housing that the first display device and the second display device provide a nearly contiguous surface. Each hinge may include at least one conduit (e.g., a hollow tube) that connects the first housing to the second housing. One or more cables may be routed through the conduit to communicate signals between the first set of components in the first housing and the second set of components in the second housing. The conduit may be used to route a thermally conductive pipe from the first housing to the second housing to enable thermal energy (e.g., heat) to be transferred from one of the housings for dissipation by a heat dissipation mechanism (e.g., heat sink) in the other of the housings. The first set of components may include a CPU, one or more memory storage devices, one or more input/output (I/O) ports, and a graphics processing unit (GPU) with a DisplayPort (DP) output connected to the first display device and an embedded DisplayPort (eDP) output connected to the second display device. The second set of components may include one or more sensors, such as an accelerometer, a magnetometer, a magnetic compass, a global positioning satellite (GPS) sensor, a gyroscope, an imaging sensor (e.g., camera), a proximity sensor, a light sensor, a barometer, a thermometer; a humidity sensor, a fingerprint scanner, a retinal scanner, another type of sensor, or any combination thereof.

Individual hinges of the one or more hinges may include a plurality of detents. Moving at least one hinge of the plurality of hinges to a first detent of the plurality of detents may cause the first housing to move to (and then remain at) a first angle relative to the second housing. Exerting an amount of force greater than a threshold amount may cause the at least one hinge to move from the first detent to a second detent, moving the first housing from the first angle to a second angle relative to the second housing. A first set of magnets may be embedded into an edge of the first housing. The first set of magnets may face outward with a first polarity. A second set of magnets (or a set of metal plates) may be embedded into an edge of the second housing. The second set of magnets may face outward with a second polarity that is an opposite polarity from the first polarity. When the first set of magnets are within a particular distance from the second set of magnets (or the set of metal plates), the first set of magnets may have an attraction to the second set of magnets (or the set of metal plates), causing the computing device to be placed in a closed position, in which the first housing is at an angle of about 0 degrees relative to the second housing. A dampener component (e.g., gears, tension springs, or the like) may be embedded into individual hinges of the one or more hinges to slow a speed at which the first housing moves relative to the second housing due to the attraction of the first set of magnets to the second set of magnets (or the set of metal plates).

A third set of magnets may be embedded into a hinge edge (e.g., an edge of a housing to which a leaf of a hinge is attached) of the first housing. The third set of magnets may have an attraction to a fourth set of magnets (or a set of metal plates) that are embedded in the hinge edge of the second housing. When the third set of magnets are within a particular distance from the fourth set of magnets (or the set of metal plates), the third set of magnets may have an attraction to the fourth set of magnets (or the set of metal plates), causing the computing device to be automatically placed in an open position in which the first housing is at an angle of about 180 degrees relative to the second housing. In the open position, an outer surface of the first display device may be in a same plane as and adjacent to an outer surface of the second display device, enabling a user to treat the two display devices as a single contiguous surface to view content and to provide touch input.

FIG. 1 is a block diagram of an architecture 100 of a computing device that includes a crossbar switch according to some embodiments. The computing device 102 may include a graphics processing unit (GPU) 104. The graphics processing unit 104 may be an independent device (e.g., integrated circuit) or may be part of a central processing unit 106. The GPU 104 may provide three video data outputs (e.g., three pipes). For example, a third video data output of the GPU 104 may be sent to a port 108. The port 108 may be used to connect an external display device to the computing device 102. In some implementations, the third video data output of the GPU 104 may be sent to a third display device of the computing device 102 (e.g., instead of to the port 108). The GPU 104 may provide a second video data output from an embedded DisplayPort (eDP) port 110. The GPU 104 may provide a third video data output from a DisplayPort (DP) port 112. First content 140(1) from the eDP 110 and second content 140(2) from the DP 112 may be sent to a crossbar switch 114. The crossbar switch 114 may be capable of routing the content 140 from the eDP 110 and the output from the DP 112 to either (or both) output 116(1) or output 116(2). The outputs 116 from the crossbar switch 114 may be sent to a DP-to-DSI converter 118. The DP-to-DSI converter 118 may convert a DisplayPort compliant signal into a display serial interface (DSI) compliant signal. For example, the DP-to-DSI 118(1) may provide two DSI lanes DSI0 120(1) and DSI1 122(1) to an internal display device 124(1). The internal display device 124(1) is a display device that is typically (e.g., in a computing device with a single display) connected to the eDP port 110. The DP-to-DSI 118(2) may receive the output 116(2) from the crossbar switch 114 and provide two DSI lanes DSI0 120(2) and DSI1 122(2) to the additional display device 124(2).

A controller 126 (e.g., an embedded controller) may receive data 136(1) to data 136(N) (where N>0) from one or more of (i) a device driver 130 (e.g., associated with GPU 104), (ii) an operating system 132 of the computing device 102, (iii) one or more sensors 134 associated with the computing device 102, or (iv) user input 142 provided by a user of the computing device 102. For example, the sensors 134 may include an accelerometer, a gyroscope, a magnetometer or a magnetic compass, a proximity sensor, a camera, another type of sensor, or any combination thereof. A user of the computing device 102 may provide the user input 142. In some cases, the user input 142 may override the data from one or more of the device driver 130, the operating system 132, or the sensors 134. For example, the controller 126 may use the data from one or more of the device driver 130, the operating system 132, or the sensors 134 to determine a particular routing and instruct the crossbar switch 114 to configure a particular routing. In some cases, the user may override the particular routing by providing the user input 142.

The computing device 102 may include a memory 138. The memory 138 may be used to store content, such as the first content 140(1) and the second content 140(2). At least one of the first content 140(1) or the second content 140(2) may include unprotected content or protected content (e.g., content protected using a DRM scheme).

The controller 126 may, based on the data 136, provide an instruction 128 to the crossbar switch 114 to select a routing that routes one or more of the first content 140(1) (from the eDP port 110) or the second content 140(2) (from the DP port 112) to one or more of the outputs 116(1) or 116(2). For example, the crossbar switch 114 may route the first content 140(1) from the eDP port 110 to the output 116(1) for display on the internal display device 124(1) and may route the second content 140(2) from the DP port 112 to the output 116(2) for display on the additional display device 124(2). As a second example, the crossbar switch 114 may route the first content 140(1) from the eDP port 110 to the output 116(2) for display on the additional display device 124(2)

and may route the second content 140(2) from the DP port 112 to the output 116(1) for display on the internal display device 124(2). As a third example, the crossbar switch 114 may route the first content 140(1) from the eDP port 110 to both the output 116(1) and 116(2) for display on the internal display device 124(1) and the additional display device 124(2). As a fourth example, the crossbar switch 114 may route the second content 140(2) from the DP port 112 to both the output 116(1) and the output 116(2) for display on the internal display device 124(1) and the additional display device 124(2).

The controller 126 may determine which routing of the crossbar switch 114 to select based on (1) an orientation of the computing device 102, (2) a display mode 144 of the operating system 132, and (3) whether DRM-protected content is being displayed. The orientation of the computing device 102 may be determined based on which of the display devices 124(1) or 124(2) is "up" (when the computing device 102 is in a horizontal orientation) or which of the display devices 124(1) or 124(2) is "left" (when the computing device 102 is in a vertical orientation). For example, the operating system 132, such as Microsoft® Windows®, may provide three display modes 144: (a) extended desktop mode where the display devices 124(1) and 124(2) behave as if they were a single display device, (b) clone mode where each of the display devices 124(1) and 124(2) display the same content, or (c) single display mode, e.g., one of the display devices 124(1) or 124(2) is off and therefore not displaying any content. For example, single display mode may be used when the computing device is in a tablet orientation to turn off a particular display device (of the display devices 124(1) and 124(2)) that is not visible to (or facing) the user.

The operating system (OS) 132 may allow DRM protected content to be displayed on a single display device (e.g., either 124(1) or 124(2)) and prevent DRM protected content from being displayed across both of the displays in extended desktop mode (because in extended desktop mode, one of the display devices 124(1) or 124(2) is to be driven by output from the DP port 112). Therefore, DRM protected content may be displayed on only one of the display devices 124(1) or 124(2) in the extended desktop mode. Thus, in all three of the modes 144 (e.g., extended desktop mode, clone mode, or single display mode), the DRM protected content may be displayed on either the internal display device 124(1) or the additional display device 124(2) depending on which of the display devices 124(1) and 124(2) is visible to the user (e.g., based on the orientation of the computing device 102).

Typically, when viewing DRM protected content such as a movie or television show, the computing device may be in a horizontal (e.g., landscape) orientation. In any of the three display modes, if the internal display device 124(1) is "up" in the horizontal orientation, then the first content 140(1) from the eDP port 110 may be sent to the output 116(1) for display on the internal display device 124(1). In any of the three display modes, if the additional display device 124(2) is "up" in the horizontal orientation, then the first content 140(1) from the eDP port 110 may be sent to the output 116(2) for display on the additional display device 124(2). In the horizontal mode, in the extended desktop mode, other applications or other content may be displayed by the display device that is "down". In the horizontal mode, in the clone mode, the DRM protected content may be displayed on both the display device that is "up" and the display device that is "down" (e.g., the content is duplicated on each of the two display devices). In the horizontal mode, in the single display mode, the DRM protected content may be displayed on the display device that is "up" while no content may be displayed on the display device that is "down".

In a tablet orientation, in which the display device 124(1) is facing in an opposite direction from the display device 124(2), the controller 126 may determine that a particular display device of the display devices 124(1) or 124(2) is visible to the user based on the data 136 (including data from the user input 142). The controller 126 may send the instruction 128 to the crossbar switch 114 to select a routing that sends the first content 140(1) from the eDP port 110 to the particular display device that is visible to the user. By routing the output of the eDP port 110 to whichever of the display devices 124(1) or 124(2) is visible to the user, the display device is able to re-orient the content when the computing device 102 is rotated. In addition, DRM protected content may be displayed in FHD by sending the output of the eDP port 110, regardless of which of the display devices 124(1) or 124(2) is "up". In the tablet orientation, the output of the eDP port 110 may be sent to the internal display device 124(1) when the internal display device 124(1) is visible to the user and may be sent to the additional display device 124(2) when the additional display device 124(2) is visible to the user. The display device that is not visible to the user may either (i) be off (e.g., in the single display mode) or (ii) display the same content being displayed on the other display device (e.g., clone mode).

In a clamshell mode in which one of the display devices 124 is at the top and the other is at the bottom, the controller 126 may identify which of the display devices 124 is at the top based on the data 136 received from one or more of the device driver 130, the OS 132, the sensors 134, and the user input 142. In the clamshell mode, if the operating system 132 is in the extended display mode, then if the internal display device 124(1) is on top, the output of the eDP port 110 is routed to the internal display device 124(1) and the output of the DP port 112 is routed to the additional display device 124(2). If the additional display device 124(2) is on top, the output of the eDP port 110 is routed to the additional display device 124(2) and the output of the DP port 112 is routed to the internal display device 124(1). In the clamshell mode, if the operating system 132 is in the clone mode, then the output of the eDP port 110 is routed to both the internal display device 124(1) and to the additional display device 124(2). As previously discussed, DRM protected content is displayed on the display device(s) to which the output of the eDP port 110 is routed (e.g., to the display device that is determined to be at the top in single display mode or to both display devices in clone mode). DRM protected content may not be displayed in FHD resolution in extended display mode because the output of the DP port 112 is encrypted and both the internal display device 124(1) and the additional display device 124(2) lack the circuitry to decrypt and display content in FHD resolution. If DRM protected content is played back while the OS 132 is in the extended desktop mode, the DRM protected content may be shown in standard definition (SD) resolution or may not be displayed at all, depending on the type of content and the DRM constraints.

In the extended desktop mode, DRM protected content may be displayed by routing the content from the eDP port 110 to one of the display devices 124(1) or 124(2). For example, playing a movie in "full screen" expands the movie to fill the particular display device that is connected to the eDP port 110. The OS 132 may, based on the DRM protection, prevent the movie from being displayed stretched across both the display devices 124(1) and 124(2). Clone mode does not violate the DRM protection because the first content 140(1) is sent from the eDP port 110 and duplicated on both of the display devices 124(1) and 124(2). In the extended desktop mode, unprotected content may be displayed stretched across both of the display devices 124(1) and 124(2) by sending half of the unprotected content from the eDP port 110 and a remaining half of the unprotected content from the DP port 112.

The GPU 104 may support three logical pipes (e.g., three video outputs). An advantage of using the crossbar switch 114 to drive both of the display devices 124(1) and 124(2) is that a single output port (e.g., the eDP port 110 or the DP port 112) of the GPU 104 is used. For example, by using a single logical pipe (e.g., a single output port) to drive both of the display devices 124(1) and 124(2) in clone mode for protected/unprotected content or in extended desktop mode for unprotected content, the two remaining logical pipes may be used to drive one or two external displays (e.g., via the port 108). In clone mode, if the crossbar switch 114 was not present, then the GPU 104 would use two logical pipes (e.g., the eDP port 110 and the DP port 112) to send the content to both the display devices 124(1) and 124(2), thereby leaving a single pipe to drive an external display (e.g., via the port 108). In some implementations, the computing device 102 may include a third display device, with each of the three logical pipes of the GPU 104 capable of driving each of the three display devices.

Table 1 summarizes the various possible routings and which port(s) are used based on (i) whether DRM content is being played back and (ii) the display mode 144 of the operating system 132 has been selected. If the content does not have DRM protection in either single display mode or clone mode, then either of the eDP port 110 or the DP port 112 may be used. Though Table 1 does not include an entry, in some implementations, unprotected content may be routed from the DP port 112 to either of the display devices 124(1) or 124(2) in single display mode or to both of the display devices 124(1) and 124(2) in clone mode. Because there is no advantage to using the DP port 112 for unprotected content in single display mode or clone mode and because the normal routing uses the output of the eDP port 110, if content does not have DRM protection in clone mode (or single display mode), then the output of the eDP port 110 is routed both (or one) of the display devices 124(1) and 124(2).

As the examples in Table 1 illustrate, in the extended desktop mode, DRM protected content is output in an unencrypted format from the eDP port 110 and sent to either the internal display device 124(1) or the additional display device 124(2) while unprotected content is output from the DP port 112 and sent to the other display device. For example, if the output of the eDP port 110 is sent to the internal display device 124(1) then the output of the DP port 112 is sent to the additional display device 124(2). If the output of the eDP port 110 is sent to the additional display device 124(2) then the output of the eDP port 110 is sent to the internal display device 124(1).

TABLE 1

| DRM | OS Display Mode | Routing | eDP Port Output | DP Port Output |
|---|---|---|---|---|
| Yes | Single Display Mode | eDP Only | Either Internal or Additional Display | Not Used |
| Yes | Clone Mode | eDP Only | Both Displays | Not Used |
| Yes | Extended Desktop Mode | Normal or Swap | One of the two displays | The other of the two displays |
| No | Single Display Mode | eDP Only | Either Internal or Additional Display | Not Used |
| No | Clone Mode | eDP Only or DP Only | Both Display Devices or Not Used | Both Display Devices or Not Used |
| No | Extended Desktop Mode | Normal or Swap | Internal or Additional Display Device | Internal or Additional Display Device |

Thus, a portable all-in-one computing device may include two display devices. An embedded controller may receive data from one or more sensors in the computing device and determine an orientation and position of at least one of the display devices. The embedded controller may modify content being sent to one or both of the display devices. In some cases, the content may be protected using a DRM scheme, such as HDCP. The content may be modified by rotating the content between approximately 0 degrees and approximately 360 degrees. For example, in some cases, the content may be rotated to the right or to the left and by 90 degrees, 180 degrees, or 270 degrees. The embedded controller may route the content being sent to one or both of the display devices based on the data received from the sensors and based on whether the additional display is configured as an extension or a clone of the internal display. In this way, a user can pick up the computing device and use it in different configurations and the embedded controller automatically (e.g., without human interaction) modifies and routes the content to one or both of the displays.

Thus, the controller 126 may receive the data 136(1) to 136(N) from one or more of the device driver 130, the operating system 132, or the sensors 134. The controller 126 may determine an orientation of the computing device 102 based on the data 136. Based on the orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). Based on (a) the display mode 144 (e.g., single mode, clone mode, or extended desktop mode) of the OS 132, and (b) whether the content being displayed is protected using DRM, the controller 126 may select a routing and send the instruction 128 to the crossbar switch 114 selecting the routing. The instruction 128 may cause the crossbar switch 114 to be configured to perform the selected routing. In some cases, a user may provide the user input 142 to modify (or override) the orientation determined by the controller 126, the routing determined by the controller 126, or both. If the orientation of the computing device 102 changes while the content is being displayed, the controller 126 may receive new data 136, determine a new orientation, determine a new routing, and automatically instruct the crossbar switch 114 to configure a new routing. Based on the new orientation of the computing device 102, the controller 126 may rotate the content being displayed between approximately 0 degrees and approximately 360 degrees. For example, in some cases, the content may be rotated to the right (clockwise) or to the left (counter-clockwise) in 90 degree increments (e.g., 90 degrees, 180 degrees, or 270 degrees). In some cases, the user input 142 may cause the controller 126 to "lock" a particular routing configuration, a particular orientation, or both, such that the controller 126 ignores any additional data received from one or more of the device driver 130, the OS 132, or the sensors 134 until the user input 142 causes the controller 126 to remove the "lock".

While the examples herein use a computing device with two display devices, the systems and techniques may also be extrapolated for use with computing devices having more than two display devices. The crossbar switch may be used to route the content from an eDP port and a DP port to (1) a first (e.g., internal) display, (2) a second (e.g., additional) display or (3) both the first display and the second display of an all-in-one computing device that includes two display devices. For example, data from sensors, such as an accelerometer, a gyroscope, a magnetometer or a magnetic compass, a proximity sensor, a camera, or other types of sensors included in the computing device may be provided to a graphic processing unit (GPU). The GPU may adjust the orientation (e.g., landscape or portrait) and position (e.g., top/bottom or left/right) of the content being sent to the two displays based on the data. Without the crossbar switch, a user of the computing device would be tasked with (i) knowing which display device the computing device considered to be the internal (e.g., primary or embedded) display device and (ii) manually orienting the displays accordingly. By using the crossbar switch, as the orientation and position of the first display and the second display changes, the computing device is able to automatically re-route the content being displayed based on the orientation.

In a computing device with two display devices, the crossbar switch may be used to select one of four possible routings: (1) normal, (2) swap, (3) eDP only, or (4) DP only. The normal routing sends the output of the eDP port to the internal display device and sends the output of the DP port to the additional display device (e.g., considered an external display device by the GPU and OS). The swap routing sends the output of the DP port to the internal display device and sends the output of the eDP port to the additional display device. The eDP only routing sends the eDP port output to both display devices. The DP only routing sends the DP port output to both display devices.

When protected content is output from the eDP port, the protected content is output in an unencrypted format (e.g., without any protection) because the output of the eDP port is intended for an internal display device. The output of the eDP port can be displayed in full high definition (FHD) resolution (at least 1280×720 pixels) on the internal display. If the protected content is output from the DP port, the DP port is designed to assume that the output is being sent to an external display that supports DRM (e.g., HDCP). Therefore, DRM protected content is output from the DP port in an encrypted format, such as encrypted using HDCP. If the additional display device connected to the DP port does not support HDCP, as is the case in an all-in-one computing device with two display devices, then the protected content may not display in FHD mode. Instead, the encrypted content (i) may be displayed in standard definition (e.g., a resolution of less than 1280×720 pixels) or (ii) may not be displayed. The crossbar switch enables the unencrypted content that is output from the eDP port to be routed to the additional display device (instead of to the internal display device) based on the orientation and position of each of the two display devices. The crossbar switch thus enables a user (i) to use a computing device that includes two display devices in any orientation and (ii) to display protected content in FHD without having paying attention to which display device is the "primary" (e.g., internal) display device and which is the "secondary" (e.g., additional) display device.

Figure 2:
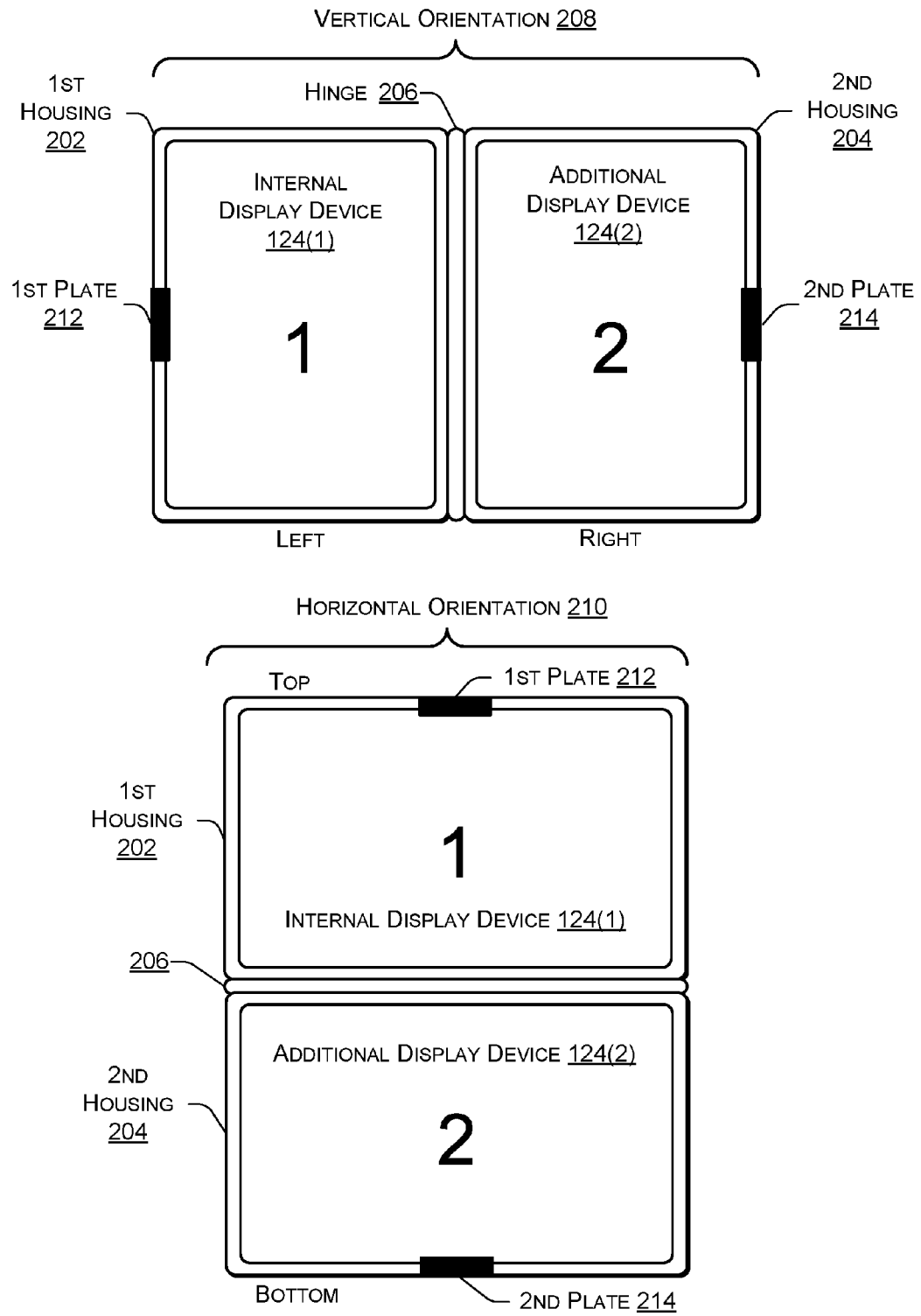
FIG. 2 is a block diagram illustrating different orientations of a dual-screen device according to some embodiments.

FIG. 2 is a block diagram illustrating different orientations of a dual-screen device (e.g., the computing device 102 of FIG. 1) according to some embodiments. The computing device 102 may include at least two display devices, the internal display device 124(1) and the additional display device 124(2). The computing device 102 may include a first housing 202 coupled to a second housing 204 by at least one hinge 206.

The computing device 102 may be displayed in a vertical (e.g., portrait) orientation 208 or a horizontal (e.g., landscape) orientation 210. For example, in the vertical orientation 208, the internal display device 124(1) may be in one housing (e.g., the left side or the right side), the additional display device 124(2) may be in the other housing (e.g., the right side or the left side), and a hinge 206 may join the internal display device 124(1) to the additional display device 124(2). In the vertical orientation 210, the internal display device 124(1) may be located at the top (or the bottom) of the computing device 102 with the hinge 206 in the middle and the additional display device 124(2) at the bottom (or the top) of the computing device. In FIG. 2, the hinge 206 is shown purely for illustration purposes. The hinge 206 may not be visible when viewing the computing device 102 from the front in the orientations 208, 210.

A first set of plates 212 may be embedded into an edge of the first housing 202 and a second set of plates 214 may be embedded into an edge of the second housing 204. A set of items comprises one or more items. One set of the plates 212, 214 is a set of magnets and the remaining set of plates 212, 214 may either be a second set of magnets or a set of metal plates. There are 3 possibilities: (1) the first set of plates 212 are magnets and the second set of plates 214 are magnets, (2) the first set of plates 212 are magnets and the second set of plates 214 are metal (e.g., non-magnetic), or (3) the first set of plates 212 are metal (e.g., non-magnetic) and the second set of plates 214 are magnets. If the first set of plates 212 are magnets and the second set of plates 214 are magnets, an outer edge of the first set of plates 212 may have a first polarity and an outer edge of the second set of plates 214 may have a second polarity that is opposite from the first polarity, thereby causing an attraction between the sets of plates 212, 214 when the distance between the sets of plates 212, 214 is less than a particular amount.

Figure 3:
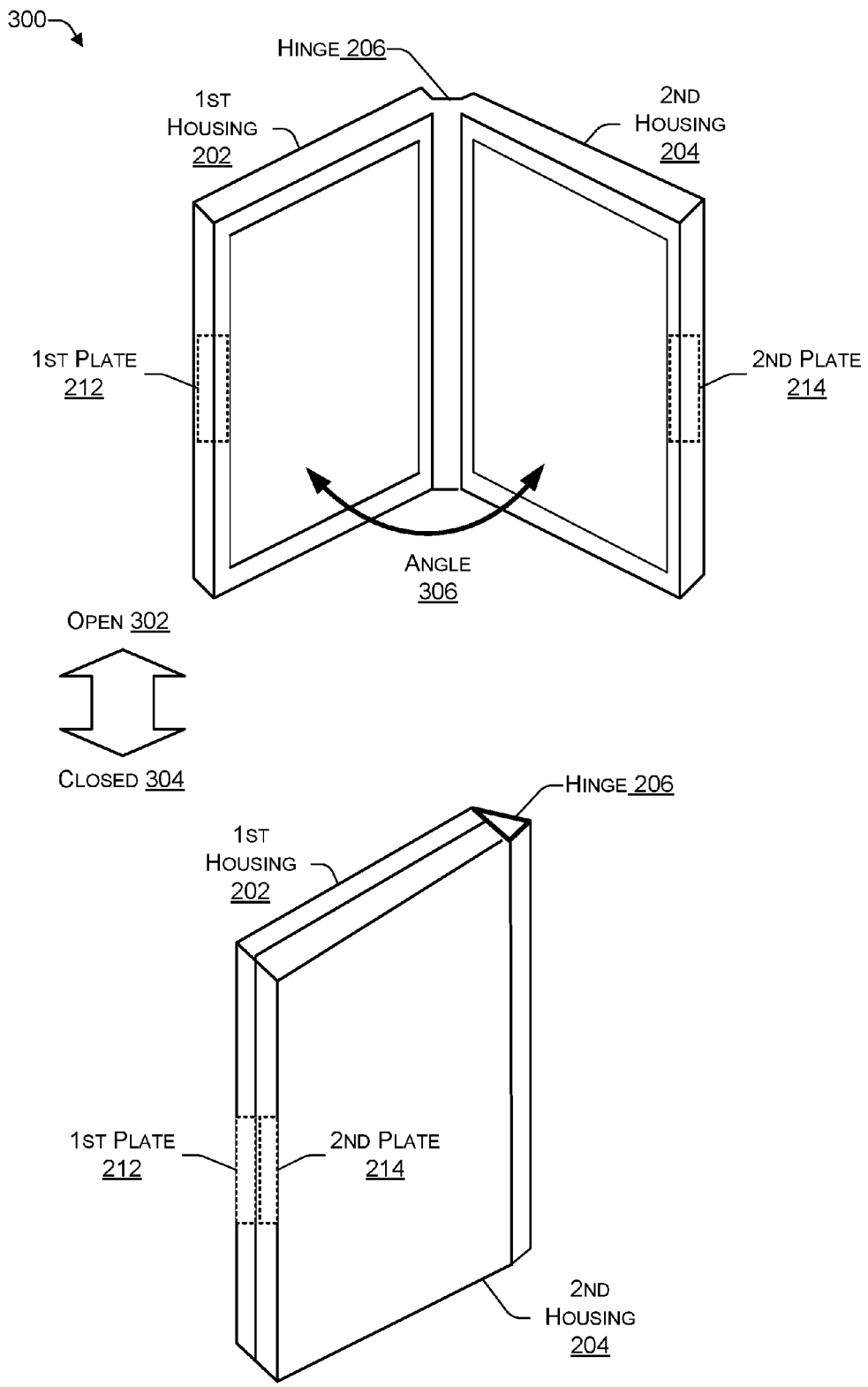
FIG. 3 is a block diagram illustrating plates embedded into a longer edge of each housing of a dual-display device according to some embodiments.

FIG. 3 is a block diagram 300 illustrating plates embedded into a longer side of each housing of a dual-display device according to some embodiments. The first set of plates 212 may be magnets embedded into at least one side of the first housing 202 and may face outward with a first polarity. The second set of plates 214 may be magnets (or a set of metal plates) and may be embedded into at least one side of the second housing 204. If the second set of plates 214 are magnets, then the magnets may face outward with a second polarity that is an opposite polarity from the first polarity. When the first set of plates (e.g., magnets) 212 are placed within a particular distance from the second set of plates 214, an attraction between the first set of plates 212 and the second set of plates 214 may cause the first housing 202 to move from an open position 302 to a closed position 304. As illustrated in FIG. 3, the computing device 102 is partially open (e.g., book mode) in the open position 302 and the first housing 202 is at an angle 306 greater than 0 degrees relative to the second housing 204. In FIG. 3, in the open position 302, the angle 306 of the first housing 202 relative to the second housing 204 is about 90 degrees. In the closed position 304, the angle 306 of the first housing 202 relative to the second housing 204 is about 0 degrees. In the closed position 304, first set of plates 212 may be in close proximity (e.g., 4 mm or less) to the second set of plates 214 and the outer surfaces of the two display devices 124(1), 124(2) may be facing each other, enabling the computing device 102 to be transported while protecting the surface of the display devices 124(1), 124(2) from scratches. The attraction between the plates 212, 214 may cause the housings 202, 204 to withstand minor movement and jostling while remaining in the closed position 304. This may enable the user to transport the computing device 102 without unintentionally placing the computing device 102 in the open position 302.

Thus, the set of plates 212, 214, in which at least one set of plates includes magnetic plates, may be used to temporarily hold the housings 202, 204 in the closed position. The hinge 206 may provide a particular amount of resistance (e.g., using gears or another mechanism to provide friction) to enable the housings 202, 204 to be placed at the angle 306 and remain at the angle 306 until an amount of force sufficient to overcome the resistance is provided to change the angle 306 to a different angle.

Figure 4:
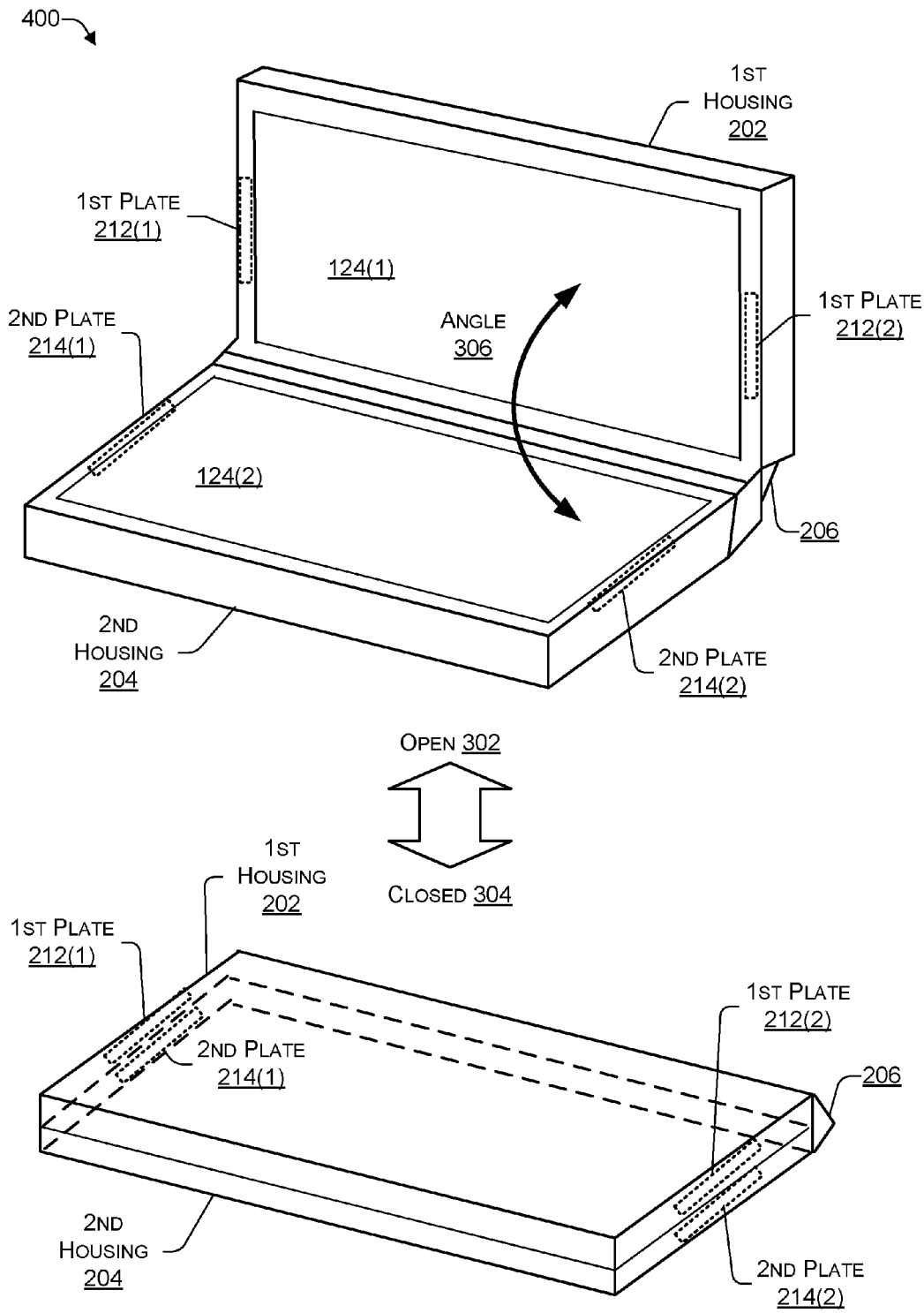
FIG. 4 is a block diagram illustrating plates embedded into a shorter edge of each housing of a dual-display device according to some embodiments.

FIG. 4 is a block diagram 400 illustrating plates embedded into a shorter side of each housing of a dual-display device according to some embodiments. The first set of plates 212(1), 212(2) may be magnets embedded into two (or more) sides of the first housing 202 and may face outward with a first polarity. In some embodiments, the first set of plates 212(1), 212(2) may be embedded into one, two, three or all four sides of the first housing 202. The second set of plates 214(1), 214(2) may be magnets (or a set of metal plates) and may be embedded into a side of the second housing 204. If the second set of plates 214(1), 214(2) are magnets, then the magnets may face outward with a second polarity that is an opposite polarity from the first polarity. When the first set of plates (e.g., magnets) 212(1), 212(2) are placed within a particular distance from the second set of plates 214(1), 214(2), respectively, an attraction between the first set of plates 212(1), 212(2) and the second set of plates 214(1), 214(2), respectively, may cause the first housing 202 to move from the open position 302 to the closed position 304. As illustrated in FIG. 4, the computing device 102 is partially open (e.g., clamshell mode) in the open position 302 and the angle 306 of the first housing relative to the second housing 204 may be about 90 degrees. In the closed position 304, the angle 306 of the first housing 202 relative to the second housing 204 may be about 0 degrees. In the closed position 304, first set of plates 212(1), 212(2) may be in close proximity to the second set of plates 214(1), 214(2), respectively, and the outer surfaces of the two display devices may be facing each other, enabling the computing device 102 to be transported while protecting the surface of the display devices from scratches. The attraction between the plates 212, 214 may cause the housings 202, 204 to withstand minor movement and jostling while remaining in the closed position 304. This may enable the user to transport the computing device 102 without unintentionally causing the computing device 102 to change to the open position 302.

Figure 5:
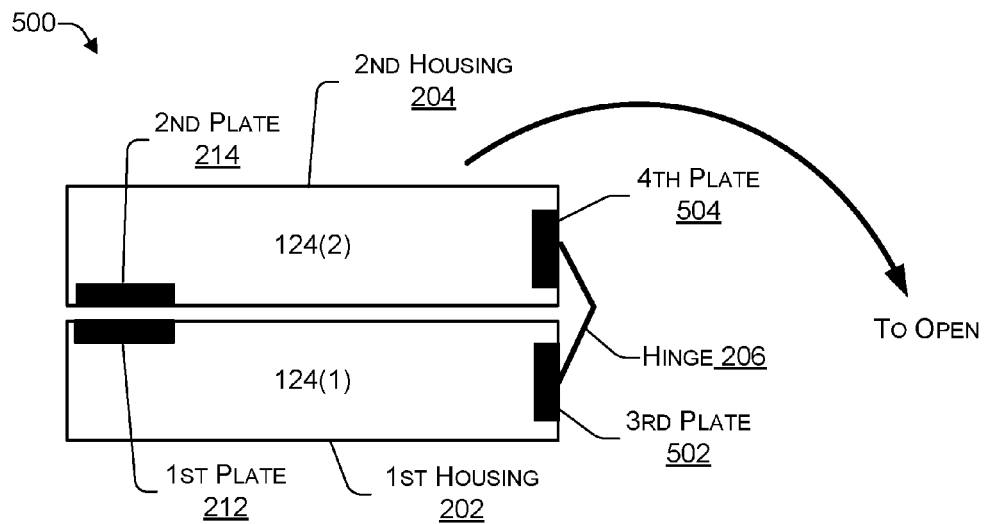
FIG. 5 is a block diagram illustrating plates embedded into each housing of a dual-display device according to some embodiments.
Figure 5:
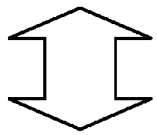
Figure 5:
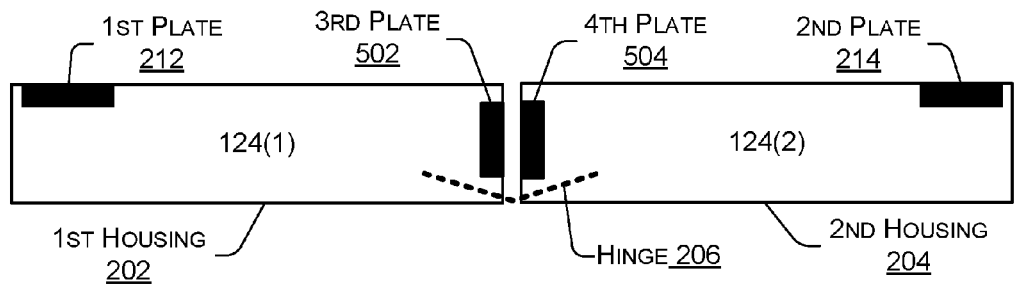

FIG. 5 is a block diagram 500 illustrating plates embedded into each housing of a dual-display device according to some embodiments. FIG. 5 provides a perspective from the bottom (or top) of the computing device 102. The first set of plates 212 may be magnets embedded into at least one side of the first housing 202 and may face outward with a first polarity. The second set of plates 214 may be magnets (or a set of metal plates) and may be embedded into at least one side of the second housing 204. If the second set of plates 214 are magnets, then the magnets may face outward with a second polarity that is an opposite polarity from the first polarity. When the first set of plates (e.g., magnets) 212 are placed within a particular distance from the second set of plates 214, an attraction between the first set of plates 212 and the second set of plates 214 may cause the first housing 202 to move from an open position 302 to a closed position 304. As illustrated in FIG. 3, the computing device 102 is fully open (e.g., tablet mode) in the open position 302 and the first housing 202 is at an angle of 180 degrees relative to the second housing 204. In the closed position 304, the first housing 202 may be at an angle of about 0 degrees relative to the second housing 204. In the closed position 304, first set of plates 212 may be in close proximity (e.g., 4 mm or less) to the second set of plates 214 and the outer surfaces of the two display devices 124(1), 124(2) may be facing each other, enabling the computing device 102 to be transported while protecting the surface of the display devices 124(1), 124(2) from scratches. In the open position 304, an outer surface of the first display device 124(1) may be in a same plane as and adjacent (e.g., 2 mm or less) to an outer surface of the second display device 124(2), enabling a user to treat the two display devices 124(1), 124(2) as a single display device when interacting with the computing device 102 to view content, to provide stylus (or touch) input, and the like.

A third set of plates 502 may be embedded into a hinge side of the first housing 202, where the hinge side is a particular side of a housing to which at least one leaf of the hinge 206 is attached. The third set of plates 502 may have an attraction to a fourth set of plates 504 that are embedded in the hinge edge of the second housing 204. When the third set of plates 502 are moved to within a particular distance from the hinge side of the second housing 204, the third set of plates 502 may have an attraction to the fourth set of plates 504, causing the first housing 202 to move to an angle of about 180 degrees relative to the second housing 204. For the set of plates 502 and 504: (1) the third set of plates 502 may be magnets and the fourth set of plates 504 may be magnets, (2) the third set of plates 502 may be magnets and the fourth set of plates 504 may be metal (e.g., non-magnetic), or (3) the third set of plates 502 may be metal (e.g., non-magnetic) and the fourth set of plates 504 may be magnets. If the third and fourth set of plates 502, 504 are both comprised of magnets, an outer edge of the third set of plates 502 may have a first polarity and an outer edge of the fourth set of plates 504 may have a second polarity that is opposite from the first polarity, thereby causing an attraction between the sets of plates 502 and 504 when the distance between the sets of plates 502, 504 is less than a particular amount. For example, when the first housing 202 is at an angle of 160 degrees (or less) relative to the second housing 204, the attraction between the plates 502, 504 may cause the housings 202, 204 to automatically move to the open (e.g., 180 degree) position 302. The attraction between the plates 502, 504 may cause the housings 202, 204 to withstand minor movement and jostling while keeping the computing device 102 in the open position.

As illustrated in FIG. 5, the hinges 206 may be configured such that in the open (180 degree) position 302, the hinges 206 move to become recessed into the housings 202, 204, thereby enabling the computing device 102 to be placed flat on a surface, such as a table or other work surface, with the display devices 124(1), 124(2) facing upward (e.g., outward). In the open position 302, the display devices 124(1), 124(2) may form a nearly contiguous surface. The operating system may configure one of the display devices 124(1), 124(2) as an extended display (e.g., as illustrated in FIG. 6) to enable the user to use the display devices 124(1), 124(2) as a single display device for viewing content and for entering stylus input.

Figure 6:
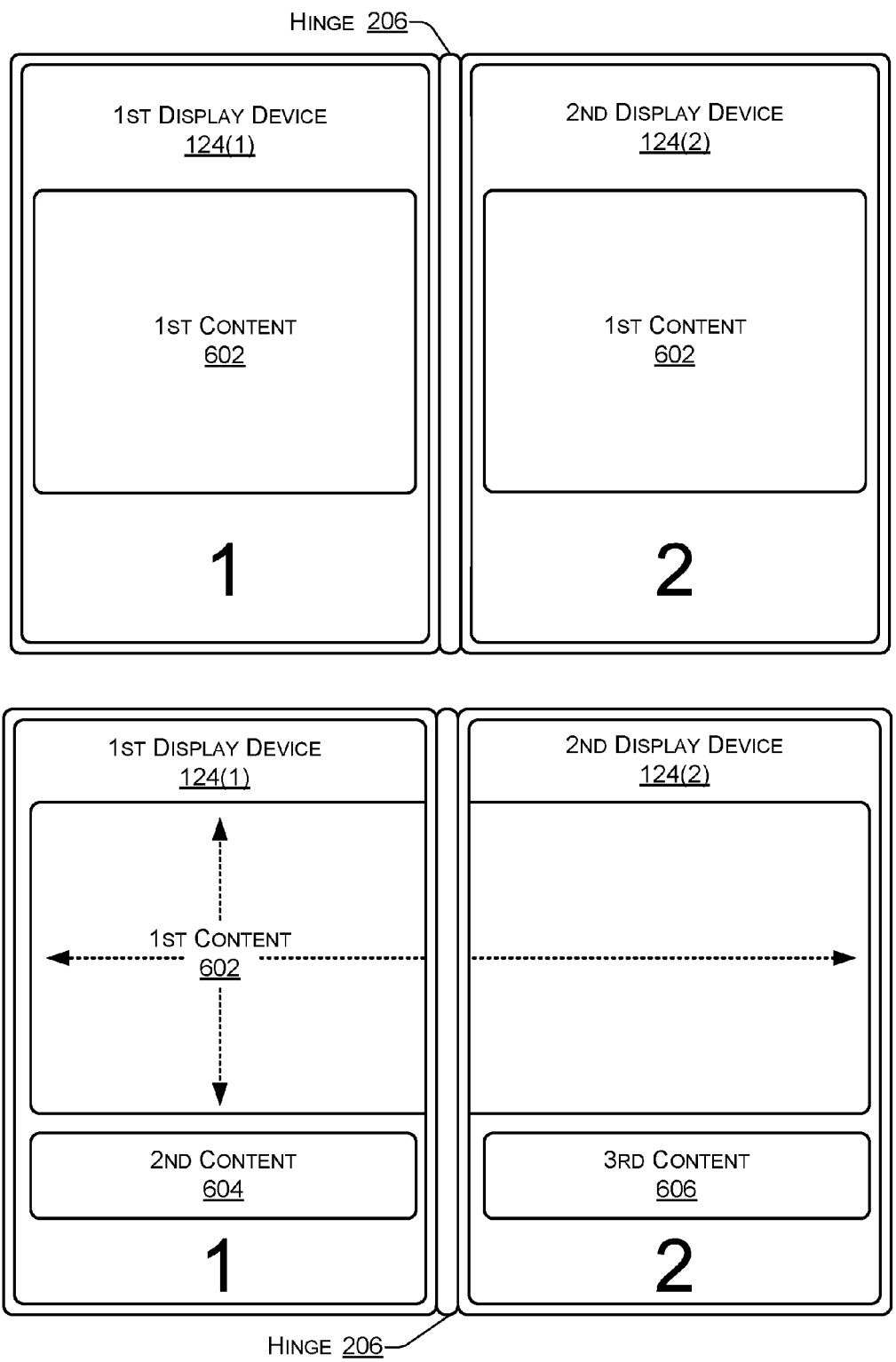
FIG. 6 is a block diagram illustrating different modes of a dual-screen device according to some embodiments.

FIG. 6 is a block diagram illustrating different modes of a dual-screen device according to some embodiments. The top half of FIG. 6 illustrates when an operating system of the dual-display device is set to display content in a clone mode or in a single display mode. In the clone mode, first content 602 may be displayed both on the first display device 124(1) and on the second display device 124(2). In the single display mode, the first content 602 may be displayed on either (but not both) of the first display device 124(1) or the second display device 124(2).

The bottom half of FIG. 6 illustrates when an operating system of the dual-display device is set to display content in an extended display mode, in which the second display device 124(2) is setup as an extension of the first display device 124(1). In the extended display mode, some content, such as the first content 602, may be displayed across both the first display device 124(1) and the second display device 124(2). In some cases, additional content may be displayed on either the first display device 124(1) or the second display device 124(2). For example, second content 604 may be displayed on the first display device 124(1) and third content 606 may be displayed on the second display device 124(2).

Figure 7:
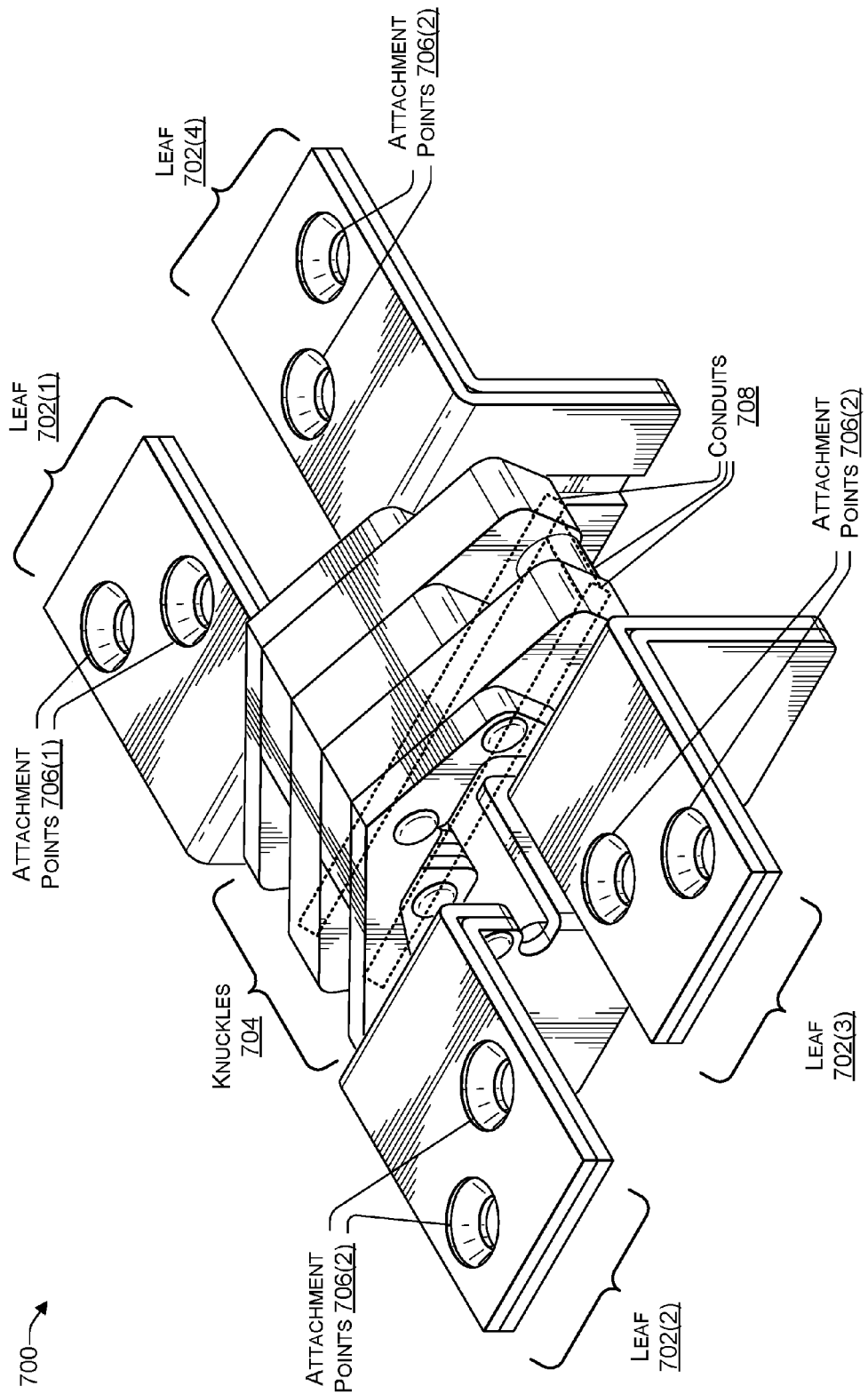
FIG. 7 is a block diagram illustrating a hinge of a multiple screen device according to some embodiments.

FIG. 7 is a block diagram illustrating components of a hinge 700 (e.g., one of the hinges 206 of FIG. 2) of a multiple screen device according to some embodiments. The hinge 700 may be made of one or more materials (or layers of materials), such as a metal, a polymer (e.g., plastic), another type of material, or any combination thereof. The hinge 700 may include at least one leaf that is to be attached to each housing. For example, as illustrated in FIG. 7, a leaf 702(1) and a leaf 702(2) may be used to attach the hinge 206 to one housing, such as the first housing 202. A leaf 702(3) and a leaf 702(6) may be used to attach the hinge 206 to another housing, such as the second housing 204. Of course, more than two or less than four of the leaves 702 may be used to attach the hinge 206 to each housing of the computing device 102. The hinge 700 may use a translating axis rather than a central axis to move the first housing 202 relative to the second housing 204.

The leaves 702 may be attached to one or more knuckles 704. The knuckles 704 may enable the leaves 702(1), 702(2) to pivot (e.g., rotate) relative to the leaves 702(3), 702(4). For example, the leaves 702(1), 702(2) may move together (e.g., simultaneously) as a first pair and the leaves 702(3), 702(4) may move together as a second pair. In FIG. 7, the leaves 702 are illustrated in a closed position, in which the first housing 202 (including the display device 124(1)) is approximately 0 degrees relative to the second housing 204 (including the display device 124(1)). The first leaf pair 702(1), 702(2) may be placed at an angle of between 0 degrees and approximately 180 degrees relative to the second leaf pair 702(3), 702(4), as illustrated in FIG. 6.

Each of the leaves 702 may be attached to one of the housings 202, 204 at one or more attachment points 706. For example, the leaf 702(1) may have the one or more attachment points 706(1), the leaf 702(2) may have the one or more attachment points 706(2), the leaf 702(3) may have the one or more attachment points 706(3), and the leaf 702(4) may have the one or more attachment points 706(4). In FIG. 7, each leaf 702 is illustrated as having two attachment points 706. However, in other implementations, each leaf 702 may include a single attachment point or may include more than two attachment points. If the attachment points 706 are implemented as holes (as illustrated in FIG. 7), then the hinge 700 may be attached to one of the housings 202, 204 with machine screws, sheet metals screws, rivets, or another type of fastener. In some cases, the holes illustrated in FIG. 7 may not be created in the leaves 702. Instead, an adhesive (e.g., epoxy, polyurethane, cyanoacrylate, acrylic polymer, or the like), thermal bonding, very high bond (VHB) material, or another type of material may be used to attach the hinge 700 to one of the housings 202.

The hinge 700 may include at least one conduit 708. The conduit(s) 708 may include one or more hollow tubes used to protect and route wiring between the housings 202, 204 within the computing device 102. Cables to connect a first set of components (e.g., CPU, memory, and the like) in the first housing 202 with a second set of components (e.g., battery, charger, and the like) in the second housing 204 may travel through the conduit(s) 708. The cables in the conduit(s) 708 may enable electrical signals to be communicated (e.g., transmitted and received) between the first set of components and the second set of components. The conduit(s) 708 may enable thermal energy to be transferred from one housing to another housing. For example, the first housing 202 may include components that generate heat (e.g., computer motherboard including CPU and memory) while the second housing 204 includes a heat dissipation component (e.g., graphene heat spreader or another type of heat sink). The conduit 708 may include a heat pipe or a type of material that is capable of transferring heat from the first housing 202 to the second housing 204. The second housing 204 may receive and dissipate the heat received via the conduit(s) 708 from the first housing 202. It should be understood that the hinge 700 may include multiple conduits that connect the two housings of the computing device 102, thereby enabling cables and thermal transfer pipes to run between the two housings.

The hinge 700 may include one or more gears, detents, a dampener element, or any combination thereof. The gears may enable the hinge 700 to be opened to a particular angle, and the gears may keep the hinge 700 at the particular angle until a sufficient amount of force to move the gears is received to move from the particular angle to a new angle. The detents may enable the hinge 700 to be opened to a particular angle, and the detents may keep the hinge 700 at the particular angle until a sufficient amount of force to move to another detent is received. The hinge 700 may include a dampener (e.g., a component to slow movement of the housings 202, 204) to slow the transition from the open position 302 to the closed position 304 or from the closed position 304 to the open position 302. As previously mentioned, sets of magnets embedded into sides of the housings 202, 204 may be used to cause a magnetic attraction that automatically places the housings 202, 204 in the open position 302 or in the closed position 304. The dampener mechanism (e.g., one or more gears, one or more springs, or the like) may be used to slow movement of the housings 202, 204 from the closed position 304 to the open position 302 or slow movement of the housings 202, 204 from the open position 302 to the closed position 304. For example, when the angle of the housings 202, 204 is less than a threshold amount from either 0 degrees or 180 degrees, the dampener mechanism may begin to slow the movement of the housings 202, 204. To illustrate, as the housings 202, 204 move from the closed position 304 to the open position 302, when the angle is less than N degrees (e.g., N>1) from 180 degrees, the dampener may act to slow the movement of the housings 202, 204. For example, the dampener may begin to slow the housings 202, 204 when the angle is at least 170 degrees (e.g., N=11). As the housings 202, 204 move from the open position 302 to the closed position 304, when the angle is less than N degrees (e.g., N>1) from 0 degrees, the dampener may act to slow the movement of the housings 202, 204. For example, the dampener may begin to slow the housings 202, 204 when the angle is 10 degrees or less (e.g., N=11).

Figure 8:
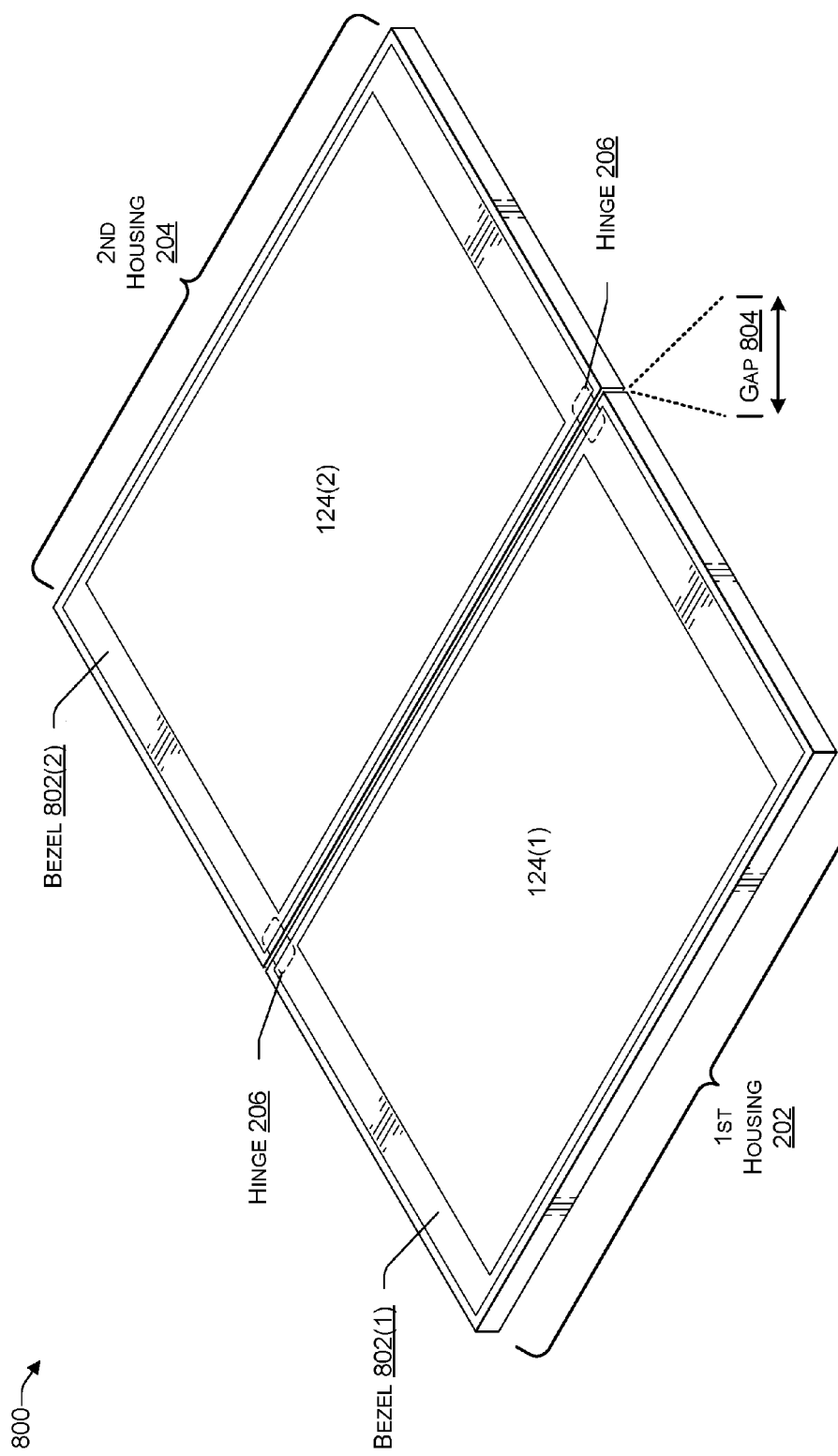
FIG. 8 is a block diagram illustrating a gap between two housings of a dual-screen device according to some embodiments.

FIG. 8 is a block diagram 800 illustrating a gap between two housings of a dual-screen device (e.g., in a fully open position) according to some embodiments. The term bezel refers to a faceplate used to frame a display device. The first housing 202 may include a bezel 802(1) that is used to frame the first display device 124(1) and the second housing 204 may include a bezel 802(2) that is used to frame the second display device 124(2). The bezels 802(1), 802(2) may be decorative, may function to hold the display devices 124(1), 124(2), respectively, in place, or a combination of both.

The bezel may be 2 mm (or greater) in width. For example, in some cases, the bezel 802(1) may be 2 mm (or more) wide on the rightmost edge and the bezel 802(2) may be 2 mm (or more) wide on the leftmost edge, e.g., at the edges nearest the hinge 206. By narrowing the bezels 802(1), 802(2) at least where the display devices 124(1) and 124(2) are closest to each other, the displays 1240, 124(2) may appear to the user as a single display device. By selecting an appropriate routing of the crossbar switch 114 of FIG. 1, the computing device 102 may enable the user to use the display devices 124(1) and 124(2) as if they were a single display device. For example, the first and second display devices 124(1), 124(2) may each include touch and/or pressure sensors that are capable of receiving input from an appendage (e.g., a user's finger) or a touch input device (e.g., a stylus). The user may use the touch and/or pressure sensors of the display devices 124(1), 124(2) to provide input while treating the first and second display devices 124(1), 124(2) as a single display device. For example, the user may enter a first portion of a sentence on the first display device 124(1) and may enter a second portion of the same sentence on the second display device 124(2). Thus, the user may begin writing (e.g., using a stylus) on the first display device 124(1) (in the first housing 202) and continue writing on the second display device 124(2) (in the second housing 204).

In some cases, the bezels 802(1), 802(2) may be 2 mm (or more) wide at the edges of the housings 202, 204 that are near the hinge 206 and wider elsewhere while in other cases the bezels 802(1), 802(2) may be 2 mm (or more) wide at each edge. For example, the bezels 802(1), 802(2), may be between about 7 mm to 9 mm wide at the top and bottom and between about 4 mm to 6 mm wide on the sides.

When the hinges 206 are in the open (180 degree) position, a gap 804 between the first housing 202 and the second housing 204 may be fairly small, e.g., 2 mm or less. For example, in some cases, the gap 804 may effectively be zero because the right outer edge of the first housing 202 may touch (or be in close proximity to) the left outer edge of the second housing 204.

Figure 9:
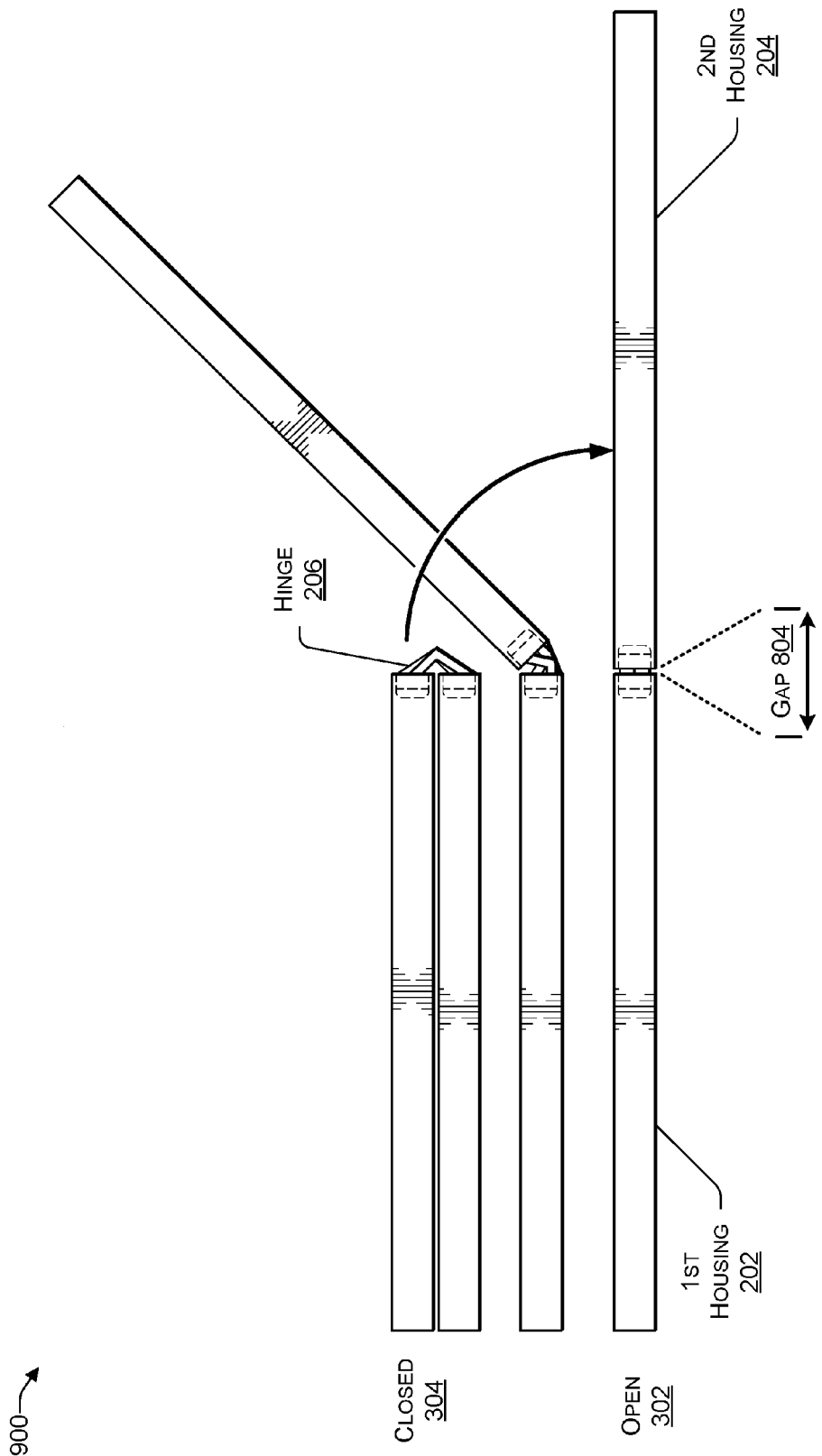
FIG. 9 is a block diagram illustrating a closed position and an open position of a dual-screen device according to some embodiments.

FIG. 9 is a block diagram 900 illustrating a closed position and an open position of a dual-screen device according to some embodiments. In the closed position 304, the first housing 202 may be at about a 0 degree angle relative to the second housing 204. For example, a top surface of the display device 124(1) may be parallel to and a close distance (e.g., 2 mm or less) to the display device 124(2) in the closed position 304. The hinge 206 may enable the second housing 204 to be placed at an angle between 0 and 180 degrees relative to the first housing 202. In the open position 302, the first housing 202 may be at about a 180 degree angle relative to the second housing 204. When the hinge 206 is in the open position 302, the gap 804 between the first housing 202 and the second housing 204 may be 2 mm or less.

Figure 10:
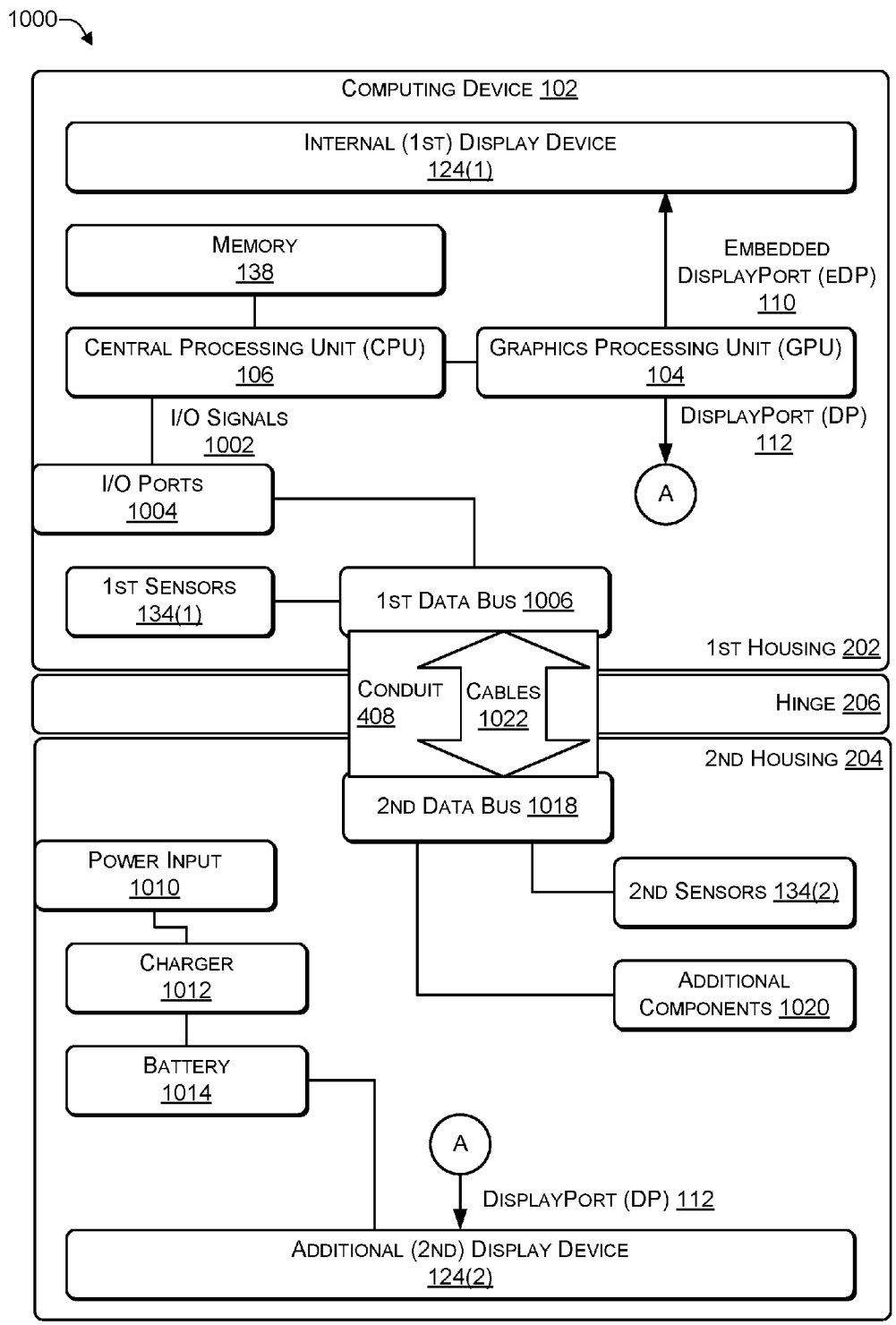
FIG. 10 is a block diagram of an architecture of a computing device that includes two housings according to some embodiments.

FIG. 10 is a block diagram of an architecture of a computing device according to some embodiments. As illustrated in FIG. 10, the computing device 102 may include the first housing 202 coupled to the second housing 204 via one or more hinges 206. The hinges 206 may enable the two housings 202, 204 to be positioned at different angles between 0 and 180 degrees relative to each other in different orientations (e.g., various vertical orientations and various horizontal orientations). Of course, additional housings may be attached via additional hinges to create a computing device with multiple housings.

The internal (e.g., first) display device 124(1) may be located in the first housing 202 and the additional (e.g., second) display device 124(2) may be located in the second housing 204. A first portion of the components of the computing device 102 may be located in the first housing 202 (e.g., behind the first display device 124(1)) while a remaining portion of the components of the computing device 102 may be located in the second housing 204 (e.g., behind the second display device 124(2)). For example, as illustrated in FIG. 10, the components located in the first housing 202 may include at least one central processing unit (CPU) 106, the graphics process unit (GPU) 104, and the memory (e.g., computer-readable media) 138.

The CPU 106 may communicate input/output (I/O) signals 1002 via multiple I/O ports 1004. The I/O ports 1004 may include video ports (e.g., a video graphics adapter (VGA) port, a digital video interface (DVI) port, a high definition media interface (HDMI) port, a ThunderBolt® port, or the like), audio ports (e.g., microphone jack, headphone jack, and the like), data ports (e.g., universal serial bus (USB) ports compliant with USB 2.0, USB 3.0, and the like), communication ports (e.g., Ethernet and the like), another type of port, or any combination thereof. In some cases, the computing device 102 may include at least one digital signal processing (DSP) processor to perform audio (and video) signal processing. The GPU 104 may provide two or more lanes of embedded DisplayPort (eDP) output 112 that are sent to the first display device 124(1) in the first housing 202 and two or more lanes of DisplayPort (DP) output 112 that are sent (e.g., wirelessly or via a cable) to the second display device 124(2) in the second housing 204.

A first data bus 1006 in the first housing 202 and a second data bus 1018 in the second housing 204 may distribute data among the various components of the computing device 102. For example, the data buses 1006, 1018 may distribute data from the I/O signals 1002, the I/O ports 1004, a first set of sensors 134(1), a second set of sensors 134(2), and additional components 1020. For example, the data buses 1006, 1018 may distribute data by receiving data from a component of the computing device 102 transmitting the data to one or more of the other components of the computing device 102.

The second housing 204 may include a remaining portion of the components of the computing device 102. In some cases, the components in the second housing 204 may be located behind the second display device 124(2). The second housing 204 may include additional components 1020 (e.g., keyboard, touchpad, trackball, speaker, microphone, Wi-Fi antenna, Bluetooth antenna, Zigbee Antenna, cellular antenna, and the like), the second set of sensors 134(2), a power input 1010 (e.g., alternating current (AC) or direct current (DC) input), a charger 1012, and a battery 1014. The battery charger 1012 may be used as a power source to provide power instead of (or in addition to) the battery 1014 when the battery 1014 is depleted or inoperable. Data cables 1022 may run through at least one conduit 408 in the hinges 206 to connect the components of the computing device 102 located in the first housing 202 with the components of the computing device 102 located in the second housing 204. The sensors 134 may include a touch-screen sensor, an accelerometer, a gyroscope, an electronic compass (e-compass), a barometer, a magnetometer, a proximity sensor, a light sensor, an imaging sensor (e.g., a camera), a fingerprint sensor, a global positioning satellite (GPS) sensor, another type of sensor, or any combination thereof.

In FIG. 10, the first set of components of the computing device 102 shown as being located in the first housing 202 and the remaining set of components shown as located in the second housing 204 are purely for illustration purposes. Depending on the implementation, different components of the computing device 102 may be housed in one or both of the housings 202, 204. For example, when the computing device 102 is designed for graphics processing, the GPU 104 and supporting hardware (e.g., graphics support chips, graphics memory, and the like) may be housed in the second housing 204. As another example, in some cases, the I/O ports 1004 may be located in the first housing 202, in the second housing 202, or split between the two housings 202, 204. As a further example, the battery 1014 may include multiple power cells, with a portion of the power cells located in the first housing 202 and zero or more of the power cells located in the second housing 204. In some cases, which components of the computing device 102 are located in each of the housings 202, 204 may be determined by the thermal characteristics of the components. For example, the components may be distributed between the housings 202, 204 to enable each of the housings 202, 204 to heat to approximately the same temperature. Doing so may avoid grouping components that generate the most heat into the same housing, thereby causing one housing to be hotter than the other housing.

Figure 11:
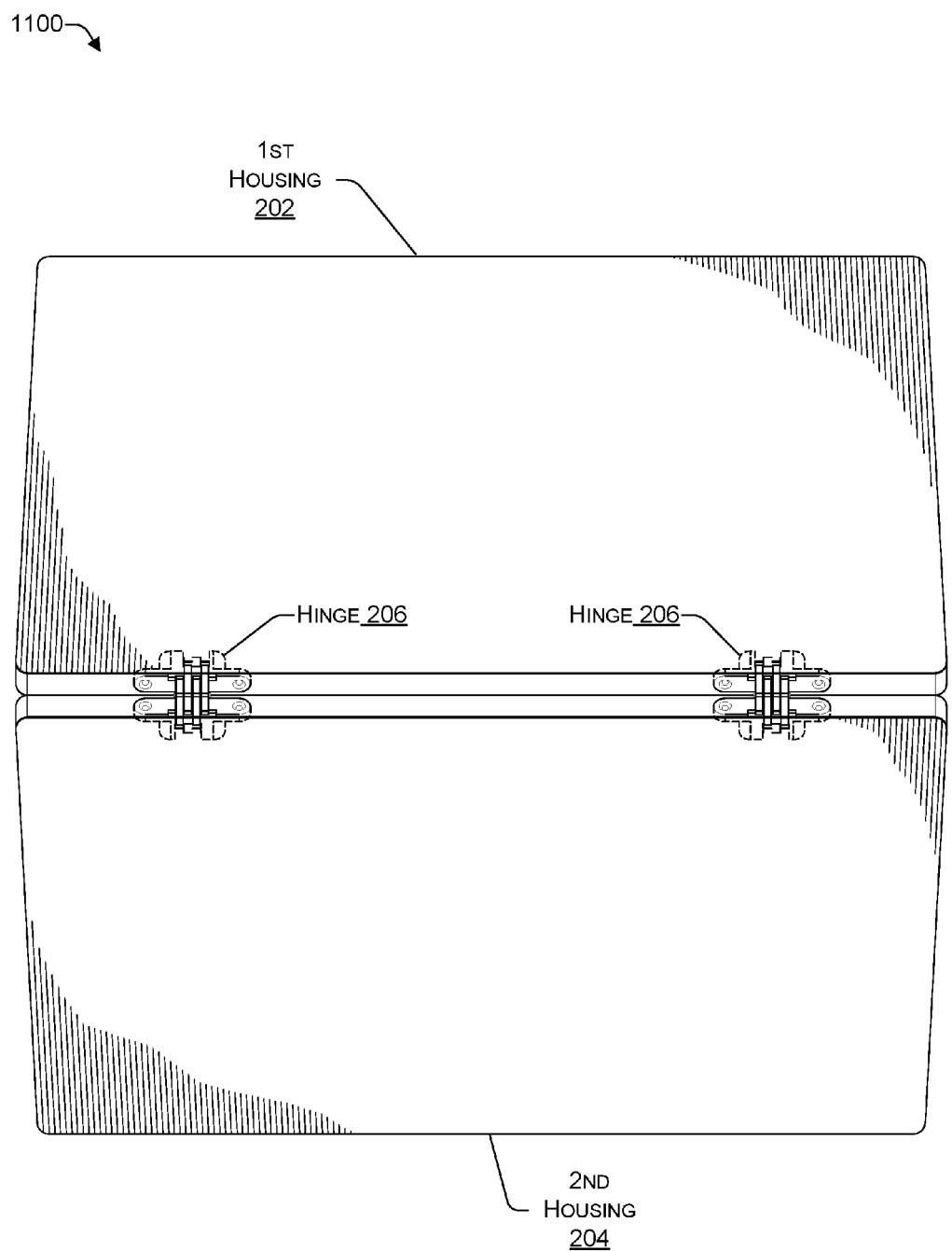
FIG. 11 is a block diagram illustrating an external surface of a computing device with multiple housings coupled to each other using one or more hinges according to some embodiments.

FIG. 11 is a block diagram 1100 illustrating an external surface of a computing device with multiple housings coupled to each other using one or more hinges according to some embodiments. For example, FIG. 11 illustrates an external perspective (e.g., the display devices are facing away) of the computing device 102, including the hinges 206, when the computing device 102 is in a partially open (e.g., less than a 180 degree angle between the housings 202, 204) position.

Figure 12:
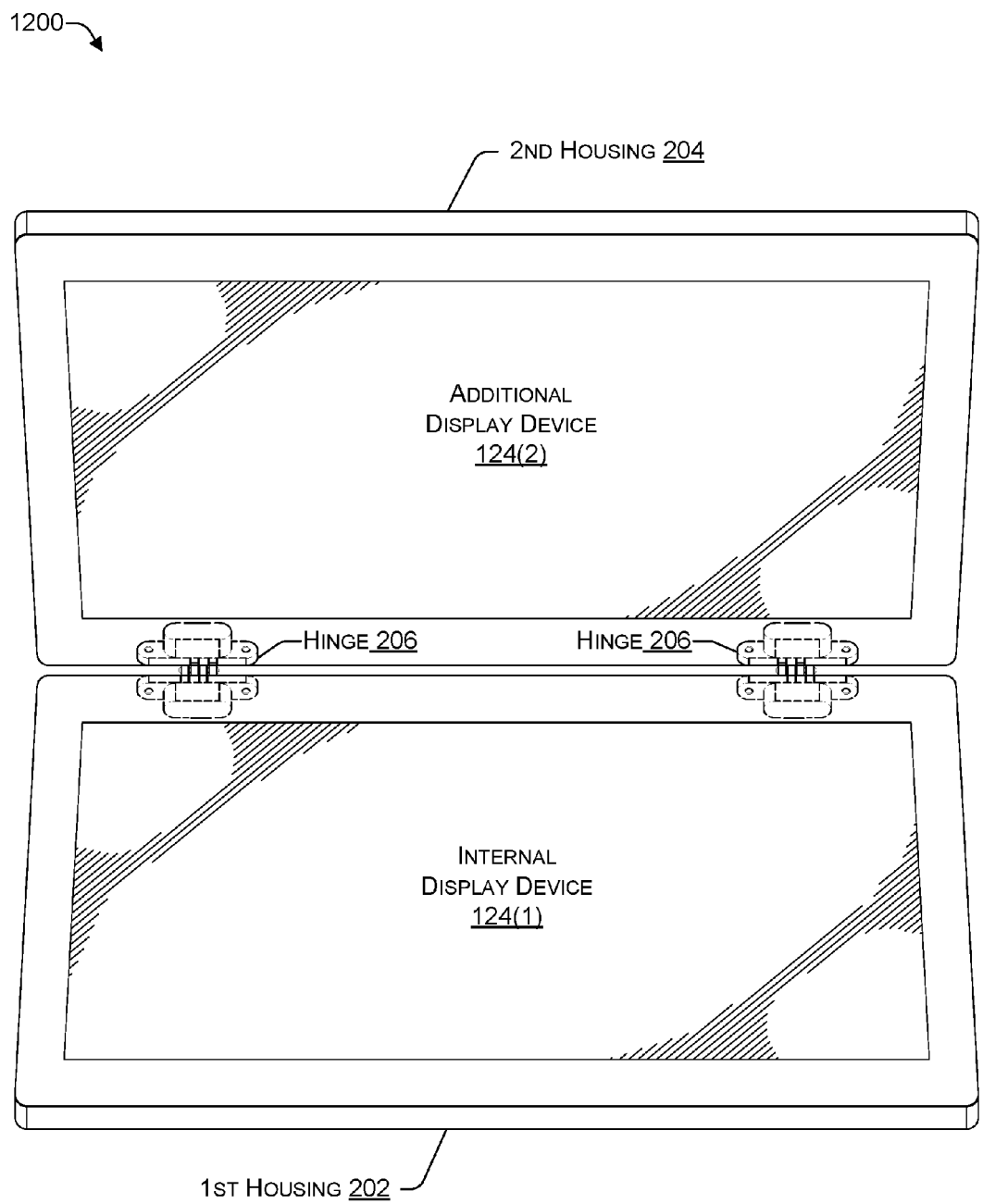
FIG. 12 is a block diagram illustrating an internal surface of a computing device with multiple display devices coupled using one or more hinges according to some embodiments.

FIG. 12 is a block diagram 1200 illustrating an internal surface of a computing device with multiple display devices coupled using one or more hinges according to some embodiments. For example, FIG. 12 illustrates a perspective of the computing device 102, including the hinges 206, in which the two display devices are facing towards the user, when the computing device 102 is in a partially open (e.g., less than a 180 degree angle between the housings 202, 204) position.

Figure 13:
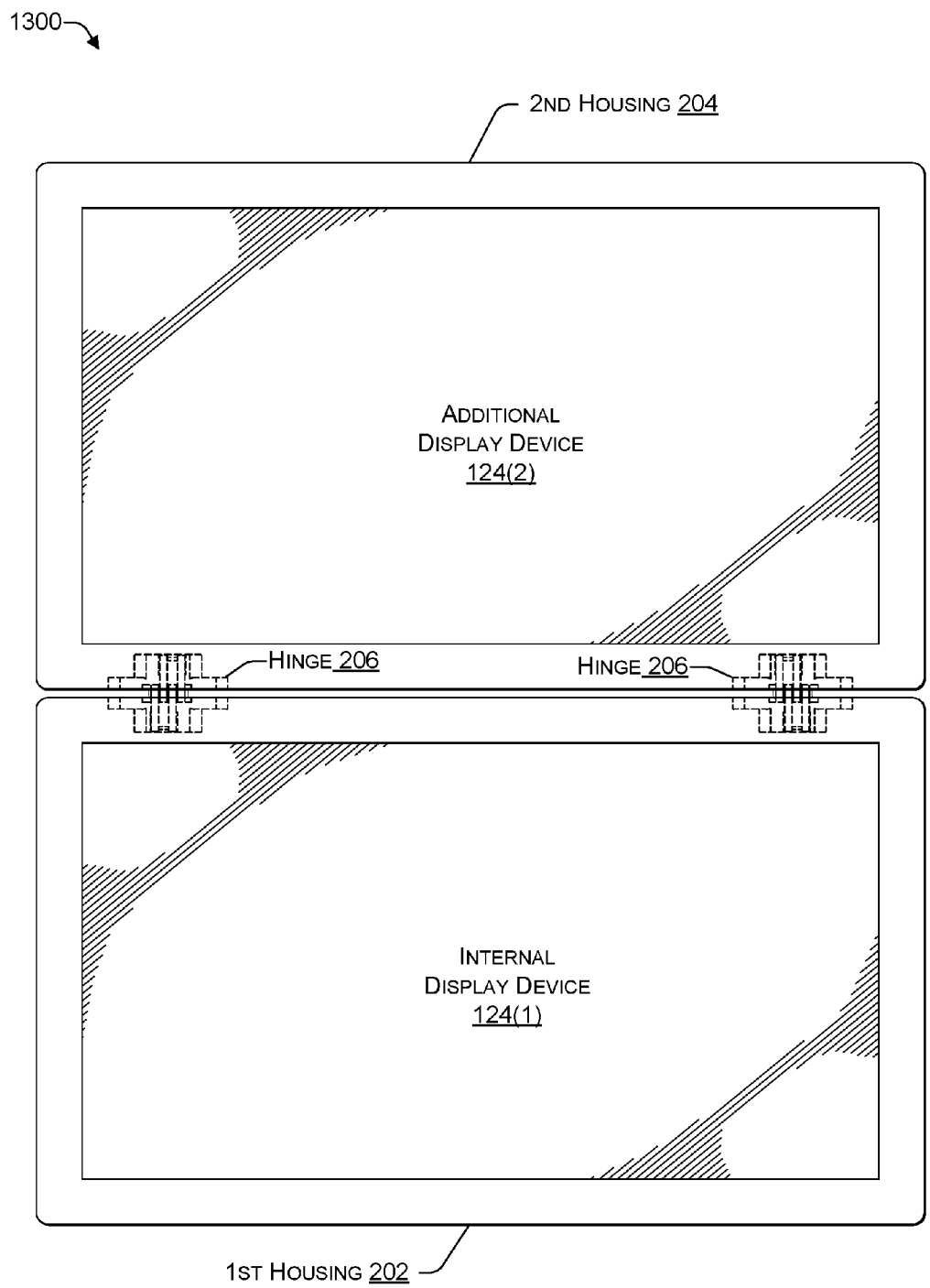
FIG. 13 is a block diagram illustrating an internal surface of a computing device with two display devices in an open position according to some embodiments.

FIG. 13 is a block diagram 1300 illustrating an internal surface of a computing device with two display devices in an open position according to some embodiments. For example, FIG. 13 illustrates a perspective of the computing device 102, including the hinges 206, in which the two display devices are facing towards the user, when the computing device 102 is in a fully open (e.g., 180 degree angle between the housings 202, 204) position.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A computing device comprising:
   a first housing comprising:
      a first display device; and
      a first set of components;
   a second housing comprising:
      a second display device;
      a second set of components; and
   one or more hinges comprising:
      a plurality of leaves coupling the first housing to the second housing; and
      one or more knuckles to position the first housing at an angle between about 0 degrees to about 180 degrees relative to the second housing, wherein when the first housing is at the angle of about 180 degrees relative to the second housing, the first housing is adjacent and sufficiently close to the second housing that the first display device and the second display device provide a nearly contiguous surface.

2. The computing device of claim 1, wherein:
individual hinges of the one or more hinges include a plurality of detents;
moving at least one hinge of the plurality of hinges to a first detent of the plurality of detents causes the first housing to remain at a first angle relative to the second housing; and
the one or more hinges are configured such that, in response to exerting an amount of force greater than a threshold amount on the first housing and the second housing:
the at least one hinge moves from the first detent to a second detent; and
the first housing is placed at a second angle relative to the second housing.

3. The computing device of claim 2, wherein the one or more hinges further comprise:
at least one conduit through which one or more cables are routed, wherein the one or more cables communicate signals between the first set of components in the first housing and the second set of components in the second housing.

4. The computing device of claim 1, further comprising:
a first set of magnets on a first edge of the first housing, wherein the first set of magnets face outward with a first polarity.

5. The computing device of claim 4, further comprising:
a second set of magnets on a second edge of the second housing, wherein:
the second set of magnets face outward with a second polarity that is an opposite polarity from the first polarity; and
when the first set of magnets are within a particular distance from the second set of magnets, the first set of magnets have an attraction to the second set of magnets, causing the first housing to be placed at an angle of about 0 degrees relative to the second housing.

6. The computing device of claim 4, further comprising:
a set of metallic plates on a second edge of the second housing facing outward; and
wherein, when the first set of magnets are within a particular distance from the set of metallic plates, the first set of magnets have an attraction to the set of metallic plates, causing the first housing to be placed at an angle of about 0 degrees relative to the second housing.

7. The computing device of claim 1, further comprising:
a third set of magnets on a hinge edge of the first housing, wherein:
the hinge edge is a particular edge of the first housing to which at least one leaf of the one or more hinges is attached; and
the third set of magnets face outward with a particular polarity;
the third set of magnets have an attraction to either a fourth set of magnets or a set of metallic plates that are embedded in the hinge edge of the second housing; and
when the third set of magnets are within a particular distance from the hinge edge of the second housing, the third set of magnets have an attraction to either the fourth set of magnets or the set of metallic plates, causing the first housing to be placed at an angle of about 180 degrees relative to the second housing.

8. A computing device comprising:
a first housing comprising:
a first display device; and
a first set of components;
a second housing comprising:
a second display device;
a second set of components; and
one or more hinges comprising:
a plurality of leaves coupling the first housing to the second housing; and
one or more knuckles having a plurality of detents to position the first housing at an angle between about 0 degrees to about 180 degrees relative to the second housing, wherein when the first housing is at the angle of about 180 degrees relative to the second housing, the first housing is adjacent and sufficiently close to the second housing that the first display device and the second display device provide a nearly contiguous surface.

9. The computing device of claim 8, wherein:
moving at least one hinge of the plurality of hinges to a first detent of the plurality of detents causes the first housing to be placed at a first angle relative to the second housing; and
exerting an amount of force greater than a threshold amount causes:
the at least one hinge to move from the first detent to a second detent; and
the first housing to be placed at a second angle relative to the second housing.

10. The method of claim 9, wherein the one or more hinges further comprise:
at least one conduit through which one or more cables are routed, wherein the one or more cables communicate signals between the first set of components in the first housing and the second set of components in the second housing.

11. The computing device of claim 8, further comprising:
a first set of magnets on a first edge of the first housing, wherein the first set of magnets face outward with a first polarity; and
a second set of magnets on a second edge of the second housing, wherein:
the second set of magnets face outward with a second polarity that is an opposite polarity from the first polarity; and
when the first set of magnets are within a particular distance from the second set of magnets, the first set of magnets have an attraction to the second set of magnets, causing the first housing to be placed at an angle of about 0 degrees relative to the second housing.

12. The computing device of claim 8, further comprising:
a first set of magnets on a first edge of the first housing, wherein the first set of magnets face outward with a first polarity; and
a set of metallic plates on a second edge of the second housing facing outward; and
wherein, when the first set of magnets are within a particular distance from the set of metallic plates, the first set of magnets have an attraction to the set of metallic plates, causing the first housing to be placed at an angle of about 0 degrees relative to the second housing.

13. The computing device of claim 8, further comprising:
a third set of magnets on a hinge edge of the first housing, wherein:

the hinge edge is a particular edge of the first housing to which at least one leaf of the one or more hinges is attached; and the third set of magnets have an attraction to either a fourth set of magnets or a set of metallic plates that are embedded in the hinge edge of the second housing; and when the third set of magnets are within a particular distance from the hinge edge of the second housing, the third set of magnets have an attraction to either the fourth set of magnets or the set of metallic plates, causing the first housing to be placed at an angle of about 180 degrees relative to the second housing.

14. A computing device comprising:
a first housing comprising:
  a first set of magnets;
  a first display device; and
  a first set of components;
a second housing comprising:
  a second set of magnets;
  a second display device;
  a second set of components; and
one or more hinges comprising:
  a plurality of leaves coupling the first housing to the second housing; and
  one or more knuckles to position the first housing at an angle between about 0 degrees to about 180 degrees relative to the second housing, wherein when the first housing is at the angle of about 180 degrees relative to the second housing, the first housing is adjacent and sufficiently close to the second housing that the first display device and the second display device provide a nearly contiguous surface.

15. The computing device of claim 14, wherein the first set of components comprise:
a graphics processing unit (GPU) comprising a DisplayPort (DP) output connected to the first display device and an embedded DisplayPort (eDP) output connected to the second display device;
at least one central processing unit (CPU);
one or more non-transitory computer-readable storage media; and
one or more input/output (I/O) ports.

16. The computing device of claim 14, wherein the second set of components comprise at least one of:
an accelerometer;
a magnetometer;
a magnetic compass;
a global positioning satellite (GPS) sensor;
a gyroscope;
an imaging sensor;
a proximity sensor;
a light sensor;
a barometer;
a thermometer;
a humidity sensor;
a fingerprint scanner; or
a retinal scanner.

17. The computing device of claim 14, wherein:
individual hinges of the one or more hinges include a plurality of detents;
moving at least one hinge of the plurality of hinges to a first detent of the plurality of detents causes the first housing to remain at a first angle relative to the second housing; and
exerting an amount of force greater than a threshold amount causes:
  the at least one hinge to move from the first detent to a second detent; and
  the first housing to be placed at a second angle relative to the second housing.

18. The computing device of claim 14, further comprising:
a first set of magnets on a first edge of the first housing, wherein the first set of magnets face outward with a first polarity;
a second set of magnets on a second edge of the second housing, wherein:
  the second set of magnets face outward with a second polarity that is an opposite polarity from the first polarity; and
  when the first set of magnets are within a particular distance from the second set of magnets, the first set of magnets have an attraction to the second set of magnets, causing the first housing to be placed at an angle of about 0 degrees relative to the second housing; and
a third set of magnets on a hinge edge of the first housing, wherein:
  the hinge edge is a particular edge of the first housing to which at least one leaf of the one or more hinges is attached;
  the third set of magnets have an attraction to either a fourth set of magnets or a set of metallic plates that are embedded in the hinge edge of the second housing; and
  when the third set of magnets are within a particular distance from the hinge edge of the second housing, the third set of magnets have an attraction to either the fourth set of magnets or the set of metallic plates, causing the first housing to be placed at an angle of about 180 degrees relative to the second housing.

19. The computing device of claim 14, further comprising:
a dampener component embedded into individual hinges of the one or more hinges wherein the dampener component slows a speed at which the first housing is placed at about 0 degrees relative to the second housing caused by the attraction of the first set of magnets to the second set of magnets.

20. The computing device of claim 14, wherein the one or more hinges further comprise:
at least one conduit through which one or more cables are routed, wherein the one or more cables communicate signals between the first set of components in the first housing and the second set of components in the second housing.

* * * * *